United States Patent
Worsham

(10) Patent No.: US 10,403,018 B1
(45) Date of Patent: Sep. 3, 2019

(54) SWARM CROWD RENDERING SYSTEM

(71) Applicant: Electronic Arts Inc., Redwood City, CA (US)

(72) Inventor: David Eli Worsham, Orlando, FL (US)

(73) Assignee: ELECTRONIC ARTS INC., Redwood City, CA (US)

( * ) Notice: Subject to any disclaimer, the term of this patent is extended or adjusted under 35 U.S.C. 154(b) by 17 days.

(21) Appl. No.: 15/208,293

(22) Filed: Jul. 12, 2016

(51) Int. Cl.
*G06T 13/40* (2011.01)
*G06T 15/04* (2011.01)
*A63F 13/55* (2014.01)

(52) U.S. Cl.
CPC .............. *G06T 13/40* (2013.01); *A63F 13/55* (2014.09); *G06T 15/04* (2013.01)

(58) Field of Classification Search
None
See application file for complete search history.

(56) References Cited

U.S. PATENT DOCUMENTS

| | | |
|---|---|---|
| 5,274,801 A | 12/1993 | Gordon |
| 5,548,798 A | 8/1996 | King |
| 5,982,389 A | 11/1999 | Guenter et al. |
| 5,999,195 A | 12/1999 | Santangeli |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,540,560 B2 | 9/2013 | Crowley et al. |
| 8,599,206 B2 | 12/2013 | Hodgins et al. |
| 8,860,732 B2 | 10/2014 | Popovic et al. |

(Continued)

OTHER PUBLICATIONS

Vigueras, Guillermo, et al. "A distributed visualization system for crowd simulations." Integrated Computer-Aided Engineering 18.4 (2011): 349-363.*

(Continued)

*Primary Examiner* — Ryan McCulley
(74) *Attorney, Agent, or Firm* — Knobbe, Martens, Olson & Bear, LLP

(57) ABSTRACT

Embodiments of systems and methods described herein are configured to render a group of virtual entities during runtime of a game application with varied appearances and animations. The virtual entities may be composed of multiple elements. The systems and methods may provide a toolbox which can configure the characteristics of the elements and/or the background characters, such as appearances, locations, and animations. During runtime of the game application, the systems and methods can automatically select and vary the characteristics based on the configurations provided by the toolbox. The systems and methods can further render elements of the background characters in batches based on similarities of the elements.

14 Claims, 12 Drawing Sheets

(56) References Cited

U.S. PATENT DOCUMENTS

| | | | |
|---|---|---|---|
| 8,914,251 | B2 | 12/2014 | Ohta |
| 9,317,954 | B2 | 4/2016 | Li et al. |
| 9,483,860 | B2 | 11/2016 | Hwang et al. |
| 9,616,329 | B2 | 4/2017 | Szufnara et al. |
| 9,741,146 | B1 | 8/2017 | Nishimura |
| 9,811,716 | B2 | 11/2017 | Kim et al. |
| 9,826,898 | B1 | 11/2017 | Jin et al. |
| 9,984,658 | B2 | 5/2018 | Bonnier et al. |
| 9,990,754 | B1 | 6/2018 | Waterson et al. |
| 10,022,628 | B1 | 7/2018 | Matsumiya et al. |
| 10,096,133 | B1 | 10/2018 | Andreev |
| 10,118,097 | B2 | 11/2018 | Stevens |
| 2002/0180739 | A1 | 12/2002 | Reynolds et al. |
| 2004/0227760 | A1 | 11/2004 | Anderson et al. |
| 2004/0227761 | A1 | 11/2004 | Anderson et al. |
| 2006/0149516 | A1 | 7/2006 | Bond et al. |
| 2006/0262114 | A1 | 11/2006 | Leprevost |
| 2007/0085851 | A1 | 4/2007 | Muller et al. |
| 2007/0097125 | A1 | 5/2007 | Xie et al. |
| 2008/0049015 | A1 | 2/2008 | Elmieh et al. |
| 2008/0152218 | A1 | 6/2008 | Okada |
| 2008/0268961 | A1 | 10/2008 | Brook |
| 2008/0316202 | A1 | 12/2008 | Zhou et al. |
| 2009/0066700 | A1 | 3/2009 | Harding et al. |
| 2009/0315839 | A1 | 12/2009 | Wilson et al. |
| 2010/0134501 | A1 | 6/2010 | Lowe et al. |
| 2010/0251185 | A1 | 9/2010 | Pattenden |
| 2011/0012903 | A1 | 1/2011 | Girard |
| 2011/0086702 | A1* | 4/2011 | Borst ............... A63F 13/533 463/30 |
| 2011/0119332 | A1 | 5/2011 | Marshall et al. |
| 2011/0128292 | A1 | 6/2011 | Ghyme et al. |
| 2011/0164831 | A1 | 7/2011 | Van Reeth et al. |
| 2011/0269540 | A1 | 11/2011 | Gillo et al. |
| 2011/0292055 | A1 | 12/2011 | Hodgins et al. |
| 2012/0083330 | A1 | 4/2012 | Ocko |
| 2012/0115580 | A1 | 5/2012 | Hornik et al. |
| 2012/0220376 | A1 | 8/2012 | Takayama et al. |
| 2012/0244941 | A1 | 9/2012 | Ostergren et al. |
| 2012/0303343 | A1 | 11/2012 | Sugiyama et al. |
| 2012/0313931 | A1 | 12/2012 | Matsuike et al. |
| 2013/0120439 | A1 | 5/2013 | Harris et al. |
| 2013/0121618 | A1 | 5/2013 | Yadav |
| 2013/0222433 | A1 | 8/2013 | Chapman et al. |
| 2013/0235045 | A1 | 9/2013 | Corazza et al. |
| 2013/0263027 | A1 | 10/2013 | Petschnigg et al. |
| 2014/0002463 | A1 | 1/2014 | Kautzman et al. |
| 2014/0198106 | A1 | 7/2014 | Sumner et al. |
| 2014/0198107 | A1 | 7/2014 | Thomaszewski et al. |
| 2015/0113370 | A1 | 4/2015 | Flider |
| 2015/0126277 | A1 | 5/2015 | Aoyagi |
| 2015/0187113 | A1 | 7/2015 | Rubin et al. |
| 2015/0235351 | A1 | 8/2015 | Mirbach et al. |
| 2015/0243326 | A1 | 8/2015 | Pacurariu et al. |
| 2015/0381925 | A1 | 12/2015 | Varanasi et al. |
| 2016/0026926 | A1* | 1/2016 | Yeung ............... G06Q 30/0269 706/12 |
| 2016/0071470 | A1 | 3/2016 | Kim et al. |
| 2016/0217723 | A1 | 7/2016 | Kim et al. |
| 2016/0314617 | A1 | 10/2016 | Forster et al. |
| 2016/0354693 | A1 | 12/2016 | Yan et al. |
| 2017/0301310 | A1 | 10/2017 | Bonnier et al. |
| 2017/0301316 | A1 | 10/2017 | Farell |
| 2018/0043257 | A1 | 2/2018 | Stevens |
| 2018/0211102 | A1 | 7/2018 | Alsmadi |

OTHER PUBLICATIONS

Hernandez, Benjamin, et al. "Simulating and visualizing real-time crowds on GPU clusters." Computación y Sistemas 18.4 (2014): 651-664.*
Thalmann, Daniel, and Soraia Raupp Musse. "Crowd rendering." Crowd Simulation. Springer London, 2013. 195-227.*
Ruiz, Sergio, et al. "Reducing memory requirements for diverse animated crowds." Proceedings of Motion on Games. ACM, 2013.*
Dudash, Bryan. "Skinned instancing." NVidia white paper(2007).*
McDonnell, Rachel, et al. "Clone attack! perception of crowd variety." ACM Transactions on Graphics (TOG). vol. 27. No. 3. ACM, 2008.*
Musse, Soraia Raupp, and Daniel Thalmann. "Hierarchical model for real time simulation of virtual human crowds." IEEE Transactions on Visualization and Computer Graphics 7.2 (2001): 152-164.*
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.*
Thalmann, Daniel, and Soraia Raupp Musse. "Modeling of Populations." Crowd Simulation. Springer London, 2013. 195-227.*
Ulicny, Branislav, and Daniel Thalmann. "Crowd simulation for interactive virtual environments and VR training systems." Computer Animation and Simulation 2001 (2001): 163-170.*
Geijtenbeek, T. et al., "Interactive Character Animation using Simulated Physics", Games and Virtual Worlds, Utrecht University, The Netherlands, The Eurographics Association 2011, 23 pgs.
Han et al., "On-line Real-time Physics-based Predictive Motion Control with Balance Recovery," Eurographics, vol. 33(2), 2014, 10 pages.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs.
Levine, S. et al., "Continuous Character Control with Low-Dimensional Embeddings", Stanford University, University of Washington, 10 pgs.
Nguyen et al., "Adaptive Dynamics With Hybrid Response," 2012, 4 pages.
Orin et al., "Centroidal dynamics of a humanoid robot," Auton Robot, vol. 35, pp. 161-176, 2013, 18 pages.
Treuille, A. et al., "Near-optimal Character Animation with Continuous Control", University of Washington, 2007, 7 pgs.
Wu et al., "Goal-Directed Stepping with Momentum Control," Eurographics/ ACM SIGGRAPH Symposium on Computer Animation, 2010, 6 pages.
Belytschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Chao et al., "A Simple Geometric Model for Elastic Deformations", 2010, 6 pgs.
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Georgii et al., "Corotated Finite Elements Made Fast and Stable", Workshop in Virtual Reality Interaction and Physical Simulation VRIPHYS (2008), 9 pgs.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.

(56) References Cited

OTHER PUBLICATIONS

Macklin et al., "Position Based Fluids", to appear in ACM TOG 32(4), 2013, 5 pgs.

McAdams et al., "Efficient Elasticity for Character Skinning with Contact and Collisions", 2011, 11 pgs.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

O'Brien et al., "Graphical Modeling and Animation of Brittle Fracture", GVU Center and College of Computing, Georgia Institute of Technology, Reprinted from the Proceedings of ACM SIGGRAPH 99, 10 pgs.

Parker et al., "Real-Time Deformation and Fracture in a Game Environment", Eurographics/ACM SIGGRAPH Symposium on Computer Animation (2009), 12 pgs.

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.

Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

Stomakhin et al., "Energetically Consistent Invertible Elasticity", Eurographics/ACM SIGGRAPH Symposium on Computer Animation (2012), 9 pgs.

Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.

Seo et al., "Compression and Direct Manipulation of Complex Blendshape Models", Dec. 2011, in 10 pgs.

Anagnostopoulos et al., "Intelligent modification for the daltonization process", International Conference on Computer Vision Published in 2007 by Applied Computer Science Group of digitized paintings.

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Fikkan, Eirik. Incremental loading of terrain textures. MS thesis. Institutt for datateknikk og informasjonsvitenskap, 2013.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Klein, Joseph. Rendering Textures Up Close in a 3D Environment Using Adaptive Micro-Texturing. Diss. Mills College, 2012.

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Hu G, Chan Ch, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

\* cited by examiner

SWARM CROWD RENDERING SYSTEM

BACKGROUND

Video games may include player characters (PC), non-player characters (NPC), and other virtual entities. The video games can allow players to control the PCs. Generally, players may not control the NPCs, although the PCs may interact with some of the NPCs (such as a trader for equipment). The video games can also provide background characters such as vegetation, vehicles, animals, humans, or other virtual entities in the background. Background characters can appear lifeless and unnatural within a game environment. Background characters may be three-dimensional (3D) or two-dimensional (2D). Generating 3D characters individually for a large group of characters can consume a lot of computing resources and may cause the video game to slow down. As a result, the video games may not dedicate resources to render 3D background characters, and may render the background characters in 2D instead.

SUMMARY OF EMBODIMENTS

The systems, methods, and devices of this disclosure each have several innovative aspects, no single one of which is solely responsible for various desirable attributes disclosed herein.

In one embodiment, a system for generating a plurality of three-dimensional (3D) agents in a game application, the system comprising: a data store configured to store appearance data associated with a plurality of 3D virtual entities, wherein each 3D virtual entity comprises elements, wherein each element comprises a mesh defining a shape of the element; one or more processors configured with computer executable instructions that cause the one or more processors to execute a game application, the game application configured to: receive a request to render a subset of the plurality of 3D virtual entities within a virtual environment during runtime of the game application; group elements of the subset of the plurality of 3D virtual entities into one or more batches based, at least in part, on the mesh of individual elements, wherein elements with similar meshes are grouped into the same batch; render elements of each batch as a group and independent of other batches of the one or more batches; and generate instructions to output the rendered elements within a frame of the game application during runtime.

In another embodiment, a method for generating a plurality of three-dimensional (3D) virtual entities in a game application, the method comprising: under the control of a computer system comprising computer hardware, the computer system configured with computer executable instructions to execute a game application, the game application configured to perform operations during runtime of the game application including, receiving a request to render a subset of the plurality of 3D virtual entities within a virtual environment during runtime of the game application; grouping elements of the subset of the plurality of 3D virtual entities into one or more batches based, at least in part, on the mesh of individual elements, wherein elements with similar meshes are grouped into the same batch; rendering elements of each batch as a group and independent of other batches of the one or more batches; and generating instructions to output the rendered elements within a frame of the game application during runtime.

In another embodiment, a non-transitory computer-readable medium storing computer-executable instructions that, when executed by one or more computing devices, configure the one or more computing devices to execute a game application, the game application configured to perform operations during runtime of the game application comprising: receiving a request to render a subset of the plurality of 3D virtual entities within a virtual environment during runtime of the game application; grouping elements of the subset of the plurality of 3D virtual entities into one or more batches based, at least in part, on the mesh of individual elements, wherein elements with similar meshes are grouped into the same batch; rendering elements of each batch as a group and independent of other batches of the one or more batches; and generating instructions to output the rendered elements within a frame of the game application during runtime.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
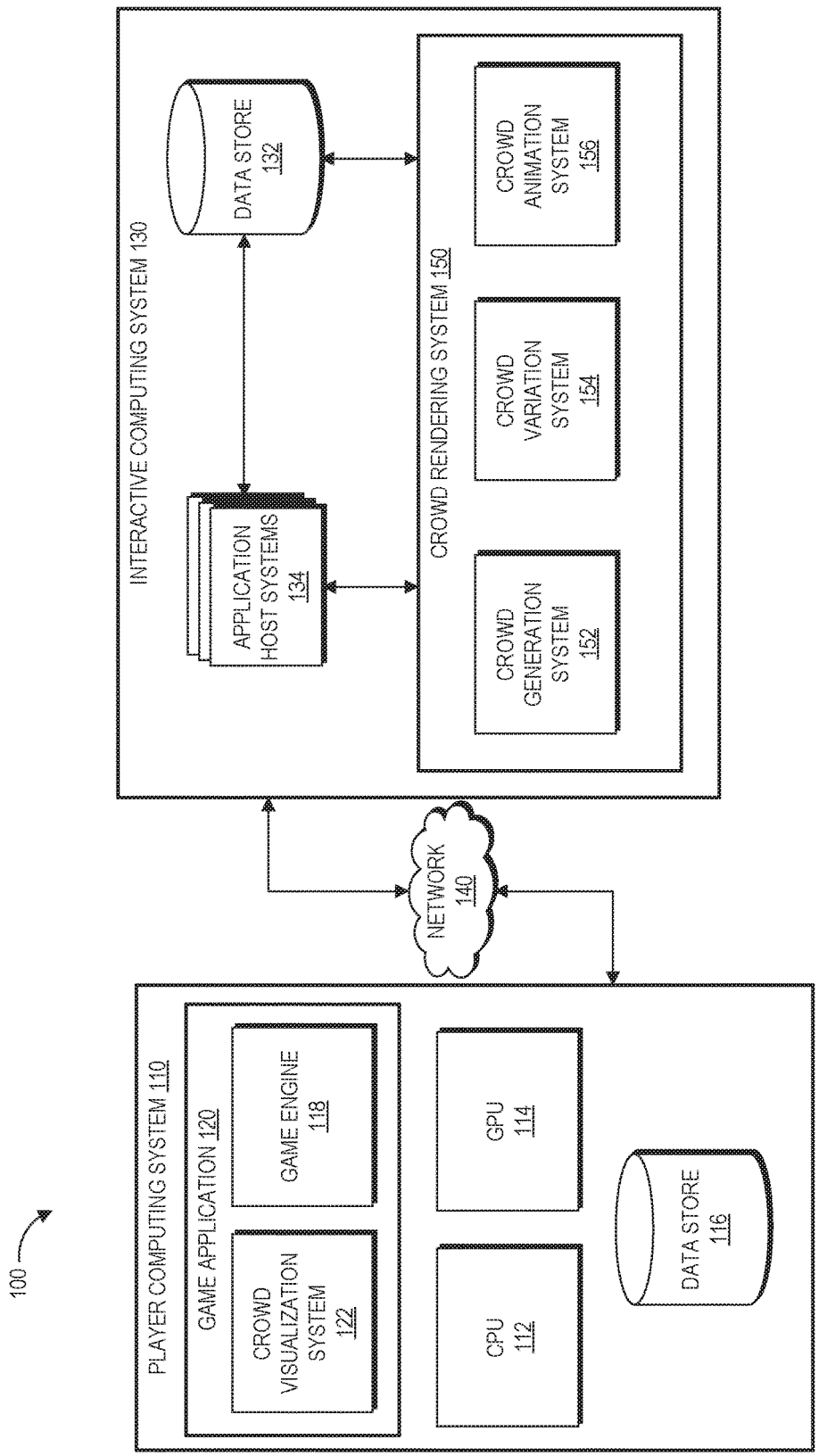
FIG. 1 illustrates an embodiment of a computing environment for implementing one or more embodiments of a crowd rendering system.

Background characters (also referred to herein as agents) within a game application may appear to lifeless or unnatural. For example, groups of background characters may appear to wear the same clothes or have same pose such as sitting or standing. In addition, when background characters are responding to an event in the game (such as by clapping), the background characters may appear to have the same motion with the same rhythm (such as everybody claps at the same speed with the same animation at the same time).

To provide a more realistic visual experience for a game application, a crowd rendering system and various other systems described herein can simulate and realistically render groupings of background characters (such as, for example, virtual characters, vegetation, vehicles, animals, buildings, and so on) in a video game application. The background characters may have varied appearances such as different clothes or different poses, and varied animations such as different movements, different facial expressions, and so on.

The background characters may be 3D characters, and 3D characters are generally rendered individually. Some video games can include a large number of background characters, which can consume a large amount of computing resources (such as processor time, memory, and so on). To reduce the effect of this problem and to improve the efficiency of visual rendering of a large group of 3D objects, in some embodiments, the systems described herein can group the characters based on defined characteristics (such as underlying meshes) and render the characters or elements of the characters in batches. As an example, a sports game may include hundreds of human characters in an audience. Each character may be composed of one or more elements such as a torso, head, arms, legs, and so on. The crowd rendering system described herein may group these characters into different batches based on the similarities between elements and more efficiently render similar elements in a batch. The crowd rendering system may be configured to render all the heads at once, all the legs at once, all the torsos at once, and so on. Within each batch, the elements may be customized to have different appearances or animations. For example, a character may have a red shirt, and another character may have a green shirts. The crowd rendering system may be configured to render all shirts with different colors and texture variations in a batch. Similarly, the crowd rending system may render torsos in a batch and include torsos that share similar characteristics such as, for example, torsos associated with a standing pose or a sitting pose.

The present disclosure further provides tools for rendering virtual entities with a game application. For example, the techniques described herein may be used in assorted games, such as sports games, role-playing games (RPGs), racing games, platformer games, and so on.

Embodiments of an Agent

Agents may include various virtual entities within a game application, such as virtual characters, vegetation, vehicles, animals, buildings, and so on. An agent may be composed of multiple elements. For example, the elements of a virtual human may include a head, arms, legs, and a torso. As another example, the elements of a tree may include leaves, branches, and a tree trunk. In some implementations, an agent may be composed of only one element. For example, a virtual human may be considered as one element, even though the virtual human has a head, arms, legs, and a torso. Similarly, a tree may also be considered as one element even though the tree has a trunk, leaves, and branches.

Each element may be associated with a mesh and different elements may have different meshes. For example, the mesh of the head is different from the mesh of the tree trunk. In addition to a mesh, the element may be associated with a skin layer. The skin layer may be used to present the appearance of the element such as skin tones, outfit, and so on. In some implementations, the agents may also include a layer for animation which allows texture-based animation in the game application. The texture layer can be independent of the skin layer.

The agents in a game application may be associated with characteristics. The characteristics may include appearance characteristics such as the outfit, facial expression, skin color, and so on, movement characteristics such as movement speed and movement path, animation characteristics such as animation state and offset of the agent, location characteristics such as position and orientation of the agent, and so on. The agents may be configured to have varied characteristics. For example, some agents may appear to wear dresses while other agents may appear to wear shirts and pants. The agents may also respond to events in a game differently. For example, some agents may clap in response to a nice shot in a sports game while other agents may stand up in response to the same event. More detailed descriptions on rendering a group of agents with varied characteristics are further explained below with respect to the crowd rendering system and the crowd visualization system.

Overview of a Computing Environment for a Crowd Rendering System

FIG. 1 illustrates an embodiment of a computing environment for implementing one or more embodiments of a crowd rendering system. The computing environment 100 can include a player computing system 110 and an interactive computing system 130. The player computing system 110 can execute a game application 120 and allow a player to play the game application 120. The interactive computing system 130 can include a crowd rendering system 150 which allows a game developer to configure the game application 120 with various functionalities, a data store 132 configured to store information (such as graphics and computer code) associated with a game application, and application host systems which are configured to host at least a portion of the game application 120. To simplify discussion and not to limit the present disclosure, FIG. 1 illustrates one player computing system 110 and one interactive computing system 130, though multiple systems may be used.

I. Player Computing System

The player computing system 110 can include a central processing unit (CPU) 112, a graphics processing unit (GPU) 114, and a data store 116. The player computing system 110 may be a computing device such as the computing device 10 illustrated in FIG. 12. The player computing system 110 may be in communication with the interactive computing system 130. For example, the interactive computing system 130 can communicate updates on the game application 120 to the player computing system 110. The player computing system 110 may use the CPU 112, the GPU 114, and the data store 116 to execute a game application 120. The game application 120 can include a game engine 124 and crowd visualization system 122 which can include instructions causing the CPU 112 and/or the GPU 114 to execute at least a portion of the game application 120.

The player computing system 110 may include hardware and software components for establishing communications over a communication network 140. For example, the player computing system 110 may be equipped with networking equipment and network software applications (for example, a web browser) that facilitates communications via one or more networks (for example, the Internet or an intranet).

a. Game Application

The game application 120 may be an offline game which can be run locally on the player computing system 110. The game application 120 may also be an online game which can involve communications among multiple computing systems. The player computing system 110 can execute a game application 120 that may be stored and/or executed in a distributed environment. For example, the player computing system 110 may execute a portion of a game and the interactive computing system 130, or an application host system 134 of the interactive computing system 120 may execute another portion of the game. For instance, the game may be a massively multiplayer online role-playing game (MMORPG) that includes a client portion executed by the player computing system 110 and a server portion executed by one or more application host systems 134. For the present discussion, the game application 120 can include a distributed application or an application that includes a portion that executes on the player computing system 110 and a portion that executes on at least one of the application host systems 134.

The game application 120 can include a crowd visualization system 122. The crowd visualization system 122 may use information defined by the crowd rendering system 150 to perform various aspects of the crowd rendering such as, creating various agents in the crowd and batch rendering a crowd of 3D characters in the game application 120. For example, while the game application 120 is loading on the player computing system 110, the crowd visualization system 122 may populate various asset arrays (described with reference to FIG. 4) associated with characteristics of the agents. As an example, the crowd visualization system 122 can procedurally select an outfit for an agent based on weights associated with the outfit. Similarly, the crowd visualization system 122 can procedurally place an agent at a location of a region based on the population and distribution instructions configured by the crowd rendering system 150.

During runtime of the game application 120, the crowd visualization system 122 may use the information of the crowd to group the agents in different batches, where agents having the same or similar meshes may be grouped in the same batch. In some embodiments, batches of elements may have varied appearances and/or animations. The crowd visualization system 122 may instruct the player computing system 110 to render many, such as more than 100,000, virtual entities with varied appearances and/or animations in a batch during runtime of the game application 120. In some embodiments, individual agents may be configured off screen. The crowd visualization system 122 can be configured to render the agents when the player changes his field of view to encompass these agents.

The crowd visualization system 122 can also simulate reactions of the crowd based on events in the game application. For example, the crowd visualization may show that some of the agents can move their head to follow the trajectory of the ball, while others may run away from the ball to avoid being hit by the ball.

b. Game Engine

The player computing system 110 may execute a game engine 118. The game engine 118 can be loaded into the memory on the player computing system 110 and can act as an interface or hub for one or more game applications 120 that interfaces with the application host systems 134.

The game engine 118 can be configured to execute aspects of the operation of the game application 120 according to game rules. Examples of game rules can include rules for scoring, possible inputs, actions/events, movement in response to inputs, and the like. Other components can control what inputs are accepted and how the game progresses, and other aspects of gameplay. The game engine 118 can receive the user inputs and determine in-game events, such as actions, jumps, runs, throws, attacks, and other events appropriate for the game application 120. During runtime operation, the game engine 118 can read user inputs, in-game data, and game state information to determine the appropriate in-game events.

c. Central Processing Unit and Graphics Processing Unit

The CPU 112 and GPU 114 can execute instructions to execute the game application. The CPU and/or GPU can be configured to render the graphics within the game application 120. The GPU 114 can be a dedicated processing unit for rendering graphics within the computing system. The GPU 114 may process the multiple batches in parallel and thereby reduce the time needed to render the crowd of objects.

d. Data Store

The player computing system 110 can include a data store 116. The data store 116 can be configured to store data that may be generated or used by the player computing system 110. For example, the data store 116 may store instructions for executing the game application 120 and the crowd visualization system 122.

II. Interactive Computing System

The interactive computing system 130 may include a crowd rendering system 150, application host systems 134, and a data store 132. The interactive computing system 130 may be part of the computing device 10 in FIG. 12. A game developer may use the interactive computing system 130 to customize various features of the game application 120.

a. Application Host Systems

As described with reference to the player computing system 110. The application host systems 134 can host at least a portion of the game application 120. The application host systems 134 can be configured to execute a portion of the game application 120 and/or game engine 118. In certain embodiments, instead of or in addition to executing a portion of the game application 120 and/or game engine 118, the application host systems 122 may execute another application, which may complement and/or interact with the game application 120 during the execution of an instance of the game application 120.

The interactive computing system 130 may enable multiple players or computing systems to access a portion of the game application 120 and/or game engine 118 executed or hosted by the interactive computing system 130. In some embodiments, the portion of the game application 120 executed by application host systems 134 of the interactive computing system 130 may create a persistent virtual world. This persistent virtual world may enable one or more players to interact with the virtual world and with each other in a synchronous and/or asynchronous manner. In some cases, multiple instances of the persistent virtual world may be created or hosted by the interactive computing system 130. A set of players may be assigned to or may access one instance of the persistent virtual world while another set of players may be assigned to or may access another instance of the persistent virtual world. In some embodiments, the application host systems 134 may execute a hosting system for executing various aspects of a game environment. For example, in one embodiment, the game application 120 may be a competitive game, such as a first person shooter or sports game, and the application host systems 134 can provide a dedicated hosting service for hosting multiplayer game instances or facilitate the creation of game instances hosted by player computing devices. In some embodiments, the application host systems 134 can provide a lobby or other environment for players to virtually interact with one another. Such environments may include environments for conducting transactions between players, such as an auction house or type of environment for facilitating transactions.

b. Crowd Rendering System

The crowd rendering system 150 can provide various tools to create and configure the game application 120. The crowd rendering system 150 can be configured to provide a game developer with an interface to generate a region in a virtual environment of the game. For example, in a game application for tennis, the virtual environment of the game application may include a stadium. The stadium, can include various objects such as audience seats, a tennis court, an avatar for the game player, and so on.

The tools of the crowd rendering system 150 can be used to configure the generation background characters (also referred to as agents) in various regions (such as the stadium) of the virtual environment of the game application. As an example, the crowd rendering system 150 can associate a crowd of agents with a seating area in the game application. The crowd of agents may be configured to have varied appearances and behaviors among themselves. As described herein, the configurations for the agents created using the crowd rendering system 150 may be applied to generate the crowd during runtime of the game application 120.

The crowd rendering system 150 can comprise a crowd generation system 152, a crowd variation system 154, and a crowd animation system 156. The crowd generation system 152 can define placements of the agents and provide instructions for rendering a plurality of agents. The crowd variation system 154 can create variations of different agents in the crowd. The crowd animation system 156 can associate appropriate animations of the agents with interactions in the game application 120.

Although examples of crowd rendering system 150 are described with reference to the crowd generation system 152, crowd variation system 154, and crowd animation system 156, the crowd rendering system 150 can have more or fewer systems. In certain embodiments, one or more components of a system may be part of another system in the crowd rendering system 150. Further details of the crowd rendering system 150 are described herein with reference to FIG. 2.

c. Data Store

The data store 132 can store information associated with the game application such as a virtual environment of the game application 120 as well as assets in the game application 120 such as graphical appearances and animations of game characters. The data store 132 can also store instructions programmed by the game developers such as customizations and various permutations of crowds of agents, location of the agents, movement paths of the agents, and so on.

An Example of a Crowd Rendering System

Figure 2:
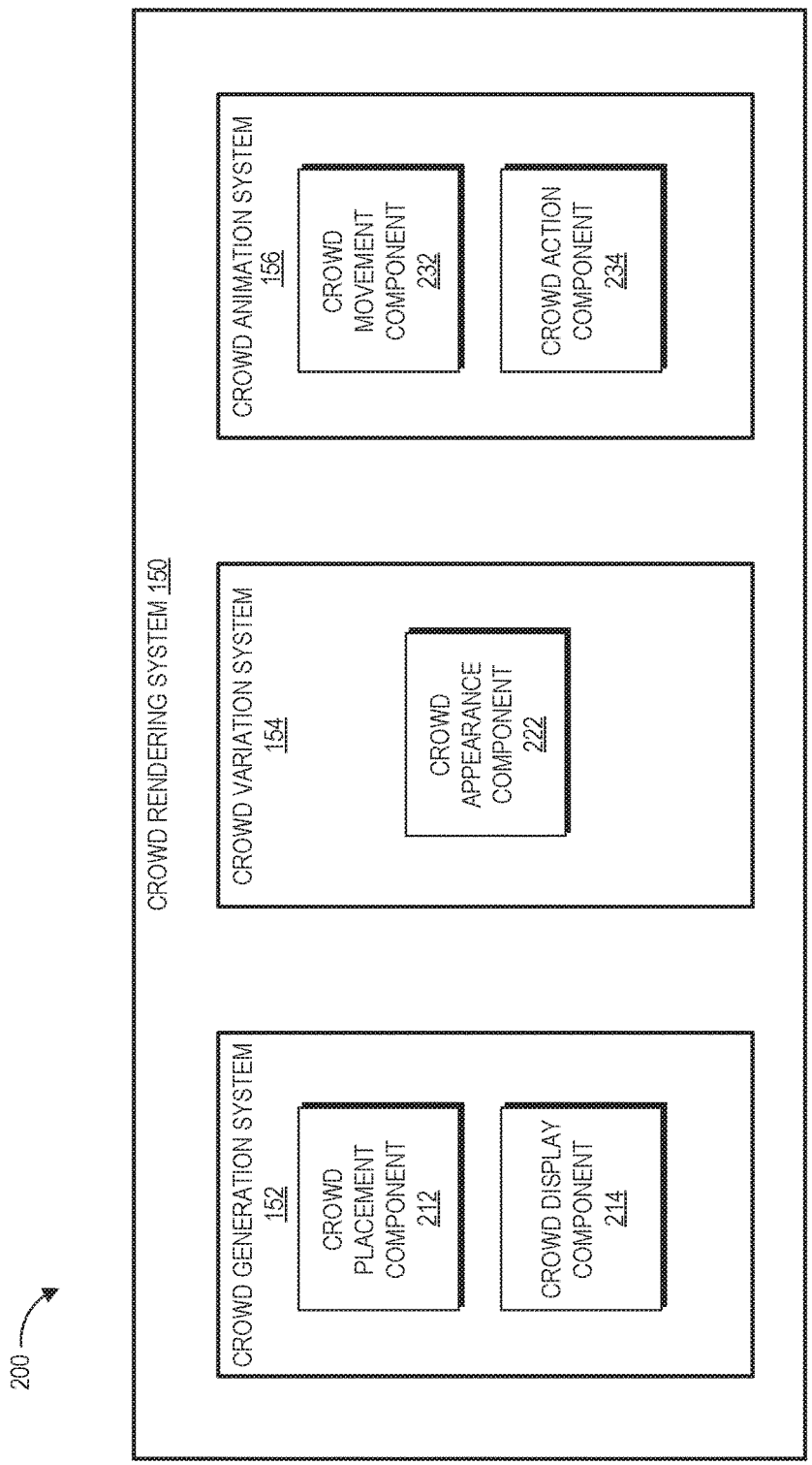
FIG. 2 illustrates an embodiment of a crowd rendering system.

FIG. 2 illustrates an embodiment of a crowd rendering system. As described above, the crowd rendering system 150 can configure instructions for rendering a crowd of agents (such as background characters) in a video game in one or more regions within a game environment. These instructions may be loaded to the player computing system 110 and applied by the crowd visualization system 122 during runtime of the game application 120 to render the crowd of agents. For example, during runtime, the crowd visualization system 122 can batch render individual agents based on their underlying meshes, where the agents with the same or similar meshes are grouped in the same batch even though their appearances or animations may vary.

The crowd rendering system 150 can communicate with a data store 132 to obtain information associated with the agents, such as, for example, meshes, skeleton, or skins of the agents. The crowd rendering system 150 can generate rules to procedurally select from a variety of animations, outfits, colors, movement paths, and so on, stored in the data store 132.

I. Crowd Generation System

In FIG. 2, the crowd generation system 152 can include a crowd placement component 212 and a crowd display component 214. The crowd placement component 212 can define placements and distributions of crowds in the game application 120. The crowd display component can configure various aspects of rendering 3D characters, such as defining level of details, culling, dispatching meshes, and so on.

In some embodiments, the crowd generating system 150 can provide live authoring, which provides an interface for a game developer to visualize changes of the placement, appearance, and animation of crowds during configuration of the crowds as well as when the game application is running.

a. Crowd Placement Component

The crowd placement component 212 can define placements and distributions of crowds within a virtual environment of the game application 120. The crowd placement component 212 can specify a region in 2D or 3D shape, in a virtual environment of the game application 120 to place the crowd of agents. The crowd placement component 212 can define placements of agents, such as position, orientation, or distribution, in the specified region. In some embodiments, a region may have multiple regions within it (which may sometimes be referred to as subregions). For example, a stadium may be considered a region. Each block of seats in the stadium may be a subregion. The crowd placement component 212 can similarly define placements of the agents in the subregions.

The crowd placement component 212 can place one or more agents in the specified region. The crowd placement component 212 can define locational characteristics of the agent such as a position and an orientation of individual agent within the virtual environment. The crowd placement component 212 may attach a point cloud to the region and distribute agents in a grouping based on the point cloud data (such as the x-y-z coordinate and/or the meta data associated with the cloud). In some embodiments, the point cloud may be attached to an object in the region. For example, in a basketball video game, the region in the virtual environment may include a virtual stadium. Within the virtual stadium, there may be seating areas and a basketball court. The point cloud may be attached to the seating areas rather than the whole stadium to ensure that audience will not appear within the basketball court.

In addition to or in alternative to the point cloud technique, the crowd placement component 212 can also allow a shape based placement. For example, the crowd placement component 212 may specify a region (such as a 2D or 3D shape) inside the virtual environment. The crowd placement component 212 can place agents inside the shape based on a distribution method, such as Poisson random distribution, a heat map, and/or other techniques, alone or in combination. In some embodiments, a region may include multiple subregions in which the crowd placement component 212 may define different shapes. For example, in a stadium, one subregion may be the seating area while the other subregion may be a band area close to the field. The seating area and the band area may have different shapes.

Figure 10:
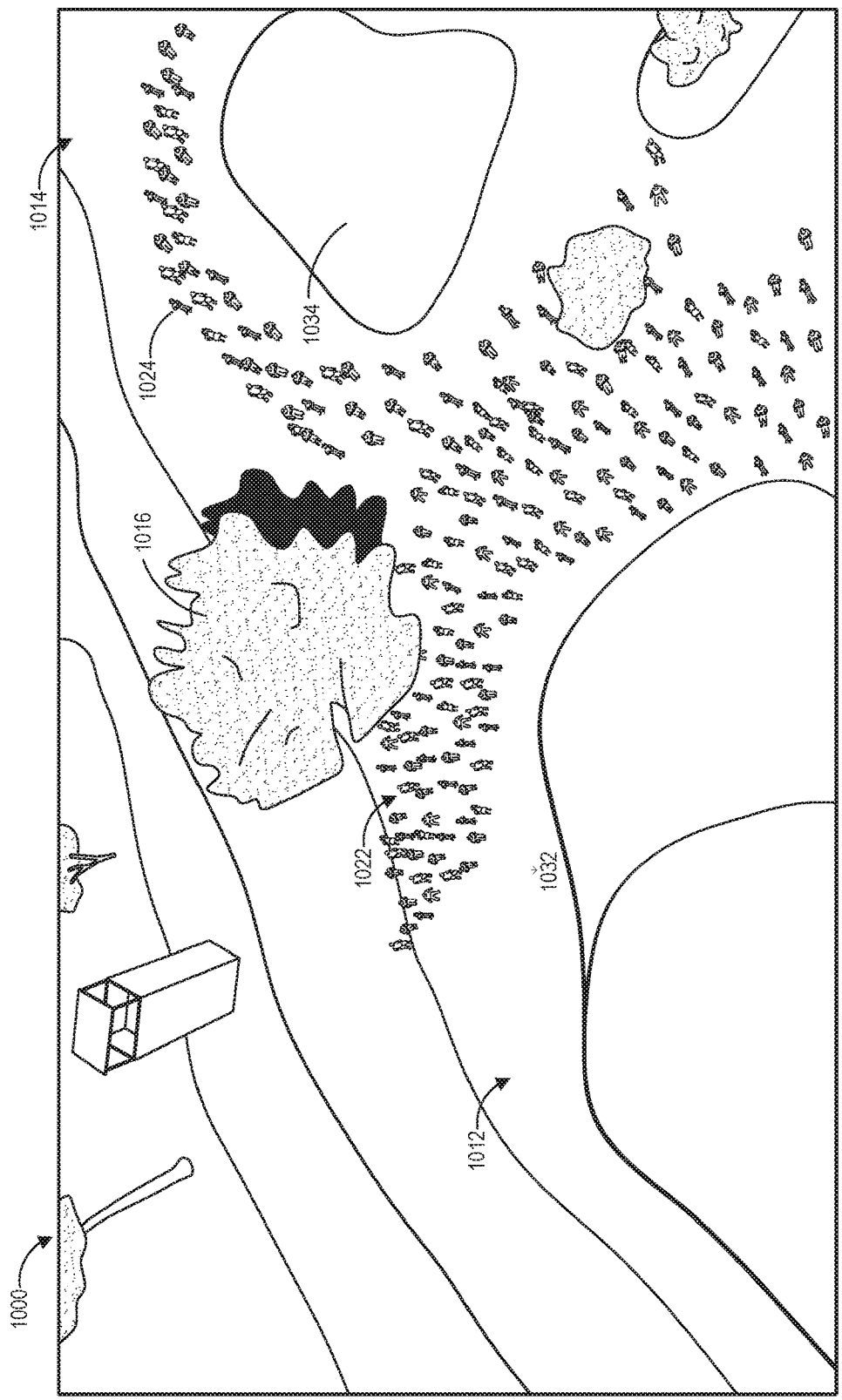
FIG. 10 illustrates an embodiment of an example of a user interface showing a plurality of agents in a region of a game environment.

When distributing agents in a region, the crowd placement component 212 can take into account static objects in the world, such as obstacles. Once the static objects are specified, the crowd visualization system 122 can avoid placing agents into the static objects. For example, as shown in FIG. 10, the obstacle can be a tree in a golf course. Although the tree may be inside of a shape for placing agents, the crowd visualization system 122 will not place the agents inside the tree. In another example, the static object may be a pool of water. The crowd rendering system can avoid placing agents into the pool of water even though the pool of water may be part of a region which allows for agents' placement.

A region can have a defined maximum capacity. The maximum capacity can be the maximum number of agents that the region can hold. For example, a region may be defined to have a maximum capacity of one. The maximum capacity may be based on the rules associated with the region. For example, the maximum capacity for a point cloud region may be determined by point cloud data. In the case of a region with a specified shape, the shape may have a maximum capacity based on the density of agents inside of it. For example, in a golf tournament game, the game developer may specify a circle around the green of the golf course. Maximum capacity of the circle may depend on the size of the circle and the size of each agent.

A region can also have a defined population, which may be a percentage of the maximum capacity. The crowd placement component 212 may associate a default population to a region. For example, the default population may be 100%, 0%, or other percentages of the maximum capacity. The population of a region may also be set explicitly by players, game developers, or events in the game, in combination or the like. For example, in response to an action by a user, the population of a stadium may be set to 50% of its maximum capacity. Accordingly, the crowd visualization system 122 will only fill 50% of the agents in the stadium. The 50% of the agents may be distributed within the region using a defined distribution method for randomly or pseudo randomly distributing the agents or based on rules. In some embodiments, when a region has multiple subregions, the population of the region may be based on a sum of all agents in different subregions. For example, suppose population of the region is set to be 50% of its maximum capacity, and the region has two subregions. The crowd visualization system 122 may generate agents which occupy 50% of each subregion or 20% for the subsection of the visiting team and 80% for the subsection of the home team.

A region can also have weighted values associated with populating the region. The values can be used to determine the types of virtual entities within a region, how fast a region is filled, the density of the region and/or other parameters. For example, in a stadium, each block of seats can be treated as a subregion. Blocks near the field can have a higher weight while those in the nosebleed section can have a lower weight. During runtime, the crowd visualization system 122 can fill the regions based on their relative weights. For example, a weight of 100 may fill 10 times faster than a weight of 10. In the stadium example, because the blocks near the field have a higher weight than those in the nose bleed section, the blocks near the field will fill faster than those in the nosebleed section. The weight can also be used to determine relative densities among the region. For example, when the crowd visualization system 122 generates agents during runtime, the density of a region with a weight of 10 may be 5 times larger as compared to the density of another region with a weight of 2.

In addition to or in alternative to a linear relationship between the weight of the region and how fast the region can be filled (and/or the relative densities of among the regions), the crowd placement component 212 can also use other mathematical relationships, such as logarithmic relationship, quadratic relationship, and so on to determine the relationship between the weight and how fast the region can be filled (and/or the relative densities of among the regions).

During runtime of the game application 120, the crowd visualization system 122 of the player computing system 110 can use both the defined population and the weight to distribute agents among multiple regions. For example, suppose the blocks near the field in a stadium have a weight of 5 while the blocks in the nosebleed section have a weight of 1. The stadium can be set to have a population of 30% of the maximum capacity of the stadium. The crowd visualization system 122 can fill the blocks near the field 5 times as fast as the blocks in the nosebleed section. As a result, when the stadium reaches the 30% of the maximum capacity, the blocks near the field may appear to have more people than the nosebleed section. This is particularly advantageous because the region will be filled or emptied dynamically and realistically based on the events in the game application.

In some implementations, the position and orientation of agents can be affected by nearby objects based on the objects properties (such as whether the objects attract the user's attention or cause the user to look away). The agents can be configured to follow a focal point within the game environment. For example, in a golf tournament game, the agents standing next to the green may face the green instead of facing away from the green. In some embodiments, the agents can be configured to follow a specific object (such as a golf ball) or entity (such as the player character). In another example, when the agents are standing next to a wall in a stadium, the agents will face away from the wall.

The crowd placement component 212 can position agents on the terrain of the game environment. For example, in a golf tournament game, the agents may be shown as standing on the grass instead of standing in the air.

b. Crowd Display Component

The crowd display component 214 can configure how a crowd is rendered in a game application. For example, the crowd display component 214 can be used to configure various aspects related to culling, level of detail when the agents are at the distance, shadows, reflections, indirect lighting, and so on.

The crowd rendering system can be configured to render be configured to agents that are in the user's field of view. This process can sometimes be referred to as culling. The crowd display component 214 implements culling in the game application by determining regions associated with each agent. This technique can also take into account when agents change their positions. Culling may also be implemented using dynamic bounding volume hierarchies or other algorithms.

The crowd display component 214 can reduce the level of details when the agents are in the distance. The crowd visualization system 122 can render meshes with varying levels of detail to increase performance based on relative size of agents with the user's field of view. The crowd display component 214 can provide different thresholds for level of details based on the distance, where the crowd display component 214 will provide more details when the distance of the agents is small. In some embodiments, when the distance is greater than a threshold, the crowd visualization system 122 can dynamically turn the 3D agents into 2D images. In another embodiment, when the distance is greater than a threshold, the crowd visualization system 122 may not render the agents at all. Additionally or alternatively to showing and hiding agents based on distance, the crowd display component 214 may also determine whether to show or hide agents in response to events. For example, when a stadium is closed, the crowd display component 214 may hide all agents in the stadium. When the stadium is open, for example in response to a game player's action, the crowd display component 214 may show some or all of the agents in the stadium.

The crowd display component 214 can provide shadows to a crowd of agents. The shadows may be planar shadows or cascading shadows. The crowd display component 214 can also simulate reflections for a crowd of agents. The reflections may be planar or dynamic. The shadows and reflections may be associated with a crowd or an individual agent. As the agents move around in the game environment, the shadows and/or reflections may change accordingly. In some embodiments, the crowd display component 214 may have multiple levels of visibility for shadows and reflections, which may vary based on events in the game. For example, the visibility of the agents' shadows may change when the agents move from an outdoor environment to inside of a stadium because the light source is different.

The crowd display component 214 can also take into account lighting conditions when configuring shadows and/or reflections. In some embodiments, areas in the shadow may appear black. In other embodiments, the crowd display component may determine the appearance of the shadows based on various light sources (such as street lights) in the environment of the game. As the agents change position, the appearance of the shadows may change accordingly.

II. Crowd Variation System

As described with reference to FIG. 1, the crowd variation system 154 can configure appearance characteristics of agents and vary the appearances of the agents in the crowd. The crowd variation system 154 can include a crowd appearance component 222 configured to determine elements of the agents, such as heads, arms, legs, or torsos, in combination or the like, as well as the appearance of the elements. The crowd appearance component 224 may also generate instructions to differentiate the looks of the agents among a crowd of agents. For example, some agents may wear green shirts while others may wear yellow shirts.

The crowd appearance component 222 can interact with data store 132 and obtain elements of the agents in a crowd. Each element may be associated with a mesh. The crowd appearance components 222 can communicate with the data store 132 and identify meshes for elements of virtual agents, such as head, arms, body, and legs.

The crowd appearance component 222 can add a skin layer (such as hair, tree bark or clothes) to the elements of an agent. For example, the crowd appearance component 222 can select a t-shirt for the upper body of the agent. The crowd appearance component 222 can select a texture among a pool of textures for a certain part. As an example, the texture selected may be silk, fur or leaves. Similarly, the crowd appearance component 222 can select a color among a pool of colors. In the same example, the crowd appearance component 222 can select a white color for the t-shirt. The crowd appearance component 222 can also employ a shader which can mix multiple textures and/or mix multiple colors for an agent. For example, the crowd appearance component 222 can select multiple colors and/or textures from a pool of available colors (and/or a pool of available textures). The shader can mix the selected colors and/or textures and apply the mixture to the appearance of an agent.

In some embodiments, the crowd appearance component 222 may attach a cull tag to one or more items so that the presence of one item may prevent the choice of the other. For example, if a dress is chosen for an agent, the crowd appearance component 222 will not choose a shirt or a pair of pants for that agent. In this example, the cull tag may be attached to the dress, the shirt, or the pair of pants, alone or in combination. In some implementations, a texture may be shared among multiple elements. For example, the texture associated with a skin tone may be applied to the whole agent.

In addition to or in alternative to choosing a texture for the elements of an agent, the crowd appearance component 222 may provide a template for the texture. The template may include a set of items. For example, in the case of a virtual human, one template may include a shirt, a pair of pants, and a pair of shoes, while another template may include a dress and a pair of high heels. The items within the template may be customized according to a pool of available options. For example, the crowd appearance component 222 can choose a pair of running shoes from assorted types of shoes for a virtual human.

Although the examples associate a mesh with an element of an agent, the mesh may also be associated with the agent as a whole. In some implementations, the virtual entity may be associated with one mesh even though the virtual entity has multiple elements such as a head and a body. For example, when the virtual entity is at a far distance from the game player, the virtual entity may include only one mesh (instead of multiple meshes each associating with a part of the virtual entity). This can reduce computing resources used for rendering the virtual entity.

The crowd appearance component 222 can create variations in appearance among a crowd of agents. Instead of wearing the same outfit, the crowd variation component 222 can procedurally generate variations between agents within a crowd by selecting different outfits and different facial features. For example, a crowd of agents may have similar elements but with varied appearances. As an example, although the crowd of agents may look slightly different, for example, by wearing a different shirt, the crowd may nevertheless use the same or a similar torso, head, arms, and legs.

The crowd appearance component 222 may use the same template for the agents in a crowd but can select different permutations for different agents based on items in the template. For example, a template for a crowd of virtual humans may include item such as hair style, face, shirts, pants, and shoes. The variations may include multiple styles (such as jeans versus dress pants) and/or multiple colors for items in the template. The crowd appearance component 222 may assemble an agent based on the permutations of some or all of the items. As an example, the crowd customization component 222 may select blonde hair, a white t-shirt, and blue jeans for one agent while selecting black hair, a green blouse, and white pants for another agent.

The items may be associated with different weights, where an item with a higher weight will be selected more often than an item with a lower weight. For example, the crowd appearance component 222 may assign a weight of 2 to jeans while it assigns a weight of 1 to yoga pants. Accordingly, for a given agent, a pair of jeans is twice as likely to be selected as a pair of yoga pants. Among a crowd of agents, there may be more people wearing jeans than leggings. Weights may also be attached to different templates. For example, a higher weight may be assigned to a template with dresses than a template with shirts. As a result, an agent is more likely wearing a dress than a shirt. The crowd appearance component 222 can determine whether a cull tag is attached to a variation. As described with reference to crowd appearance component, once a dress is selected for an agent, the crowd appearance component 222 will not select a pair of pants for the agent. As another example, if suit jacket is selected for an agent, the crowd appearance component 222 will not select yoga pants. Instead, the crowd appearance component 222 may be configured to select a pair of pants that matches the suit jacket. In some embodiments, the weights can vary based on several factors such as season, temperature, color of the teams, trends, and so forth.

In some embodiments, items can include trademarked features and have weights assigned in accordance with contracts with third parties. For example, 20% of shirts may have Nike logo, or 15% of shoes might had Adidas logo. In some embodiments, a minimum percentage of specific agent types may be associated with items, for example, at least 10% children wear a specific shoe or at least 5% red hair wear specific pants, at least 25% blonde hair have a specific logo on a shirt, and the like.

As further described with reference to FIG. 4, permutations associated with different elements may be stored in a data structure having multiple arrays. The crowd visualization system 122 can access the data structure and render the agents based on the permutations during runtime of the game application 120. Accordingly, the appearances of the game crowd may be different from one game session to another.

In some implementations, appearances of the crowds may be associated with a character class, where crowds for different character classes may have varying appearances. For example, in a sports game, the crowd appearance component 222 may associate a crowd of agents with an audience class while associating another crowd of agents with a cheerleading class. The cheerleading agents may wear a different uniform than the agents in the audience. In some embodiments, multiple classes can be placed within a single region. For example, an audience can have male and female adults, male and female children, and/or other classes.

Although the examples of the crowd variation system 154 are described with reference to the crowd appearance component 222, the crowd variation system 154 is not limited to have only the crowd appearance components 222. In some implementations, the crowd variation system 154 can have more than one component. For example, the crowd variation system 154 can use one component for determining elements of an agent and use another component for defining variation rules within the crowd.

III. Crowd Animation System

The crowd animation system 156 can configure movement paths and animations of a crowd of agents. The crowd animation system 156 can include the crowd movement component 232 for setting movement paths associated with the crowds of agents. The crowd animation system 156 can also include a crowd action component 234 for associating various animations with agents. The animations may be based on events in a game application. Although the crowd movement component 232 and crowd action component 234 are part of the crowd animation system 156 as shown in FIG. 2, the crowd movement component 232 and/or the crowd action component 234 are not required to be part of the crowd animation system 156. For example, in some embodiments, the crowd movement component 232 may be part of the crowd placement component 212 while the crowd action component 234 may be part of the crowd appearance component 222.

a. Crowd Movement Component

The crowd movement component 232 can define various movement characteristics of the crowd, such as speed, type of movement, field of view, movement path, and so on. The crowd movement component 232 may be used to define movements for artificial intelligence-driven locomotion for characters. It may also be used for graphics processing unit (GPU)-driven locomotion for a plurality of characters. Various methods, such as Boids technique, may be used simulate the movement of the crowd.

The crowd movement component 232 can provide a customized setting for the speed of the agents' movements. For example, the crowd movement component 232 can attach a faster speed to a crowd of cars while attaching a lower speed to a crowd of virtual humans.

The crowd movement component 232 can customize the type of movements for the crowds of agents. For example, the crowd movement component 232 may associate running with a crowd of agents while associating walking with another crowd of agents.

In some embodiments, the crowd movement component 232 can attach a field of view to a crowd of agents or individual agents. Accordingly, scenes in the field of view can change based on the crowd's movement. The crowd movement component 232 can define movement paths by defining a network of paths. The network may include multiple nodes. The nodes may include settings such as path width, whether the path is one-way or two-way, and so on.

The crowd movement component 232 can take into account obstacles along the movement path. For example, when a tree is along the movement path, the agents can circumvent the tree so that the agents will not walk into the tree. The crowd can also interact with other objects in the environment. As described with reference to the crowd placement component 212, when a repulser exists in the virtual environment, the crowd may move away from the repulser when the crowd is within certain distance of the repluser. This can avoid collision between an agent (such as a person) and an object (such as a building) in the virtual environment.

The crowd movement component 232 can also avoid collision among agents within the same crowd or in different crowds. For example, the crowd movement component 232 can avoid intersection of movement paths between two crowds of agents. In other implementations, when two agents are close to each other, the crowd movement component 232 may stop or divert one of the agents. As an example, when a car gets close to a virtual pedestrian on a street, the car may stop and let the virtual pedestrian to move first before the car resumes the movement. In another example, the crowd may stop when the traffic light is red and move when the traffic light is green.

b. Crowd Action Component

The crowd action components can configure animation characteristics associated with an agent. The animation characteristics may be based on events in the game. The crowd animation component 234 can communicate with the data store 132 to obtain a pool of animations. The crowd animation component 234 can randomly assign an animation to an agent or a crowd of agents. For example, in a sports game, the animations associated with audience may include standing, sitting, cheering, talking, booing, and the like. The crowd animation component can determine one of the available animations for an agent. The animations can be selected randomly, sub-randomly, procedurally, or using other techniques. For example, the crowd action component 234 may assign the animation for sitting to all agents in the audience area while assigning the animation for standing to agents adjacent to the field in the stadium.

In some embodiments, various animations may be associated with different weights. For example, the animation for standing may have a weight of one while the animation for sitting may have a weight of two for a crowd of agents. As a result, an agent is twice likely to be sitting than standing.

The animations of crowds may be associated with a character class where crowds for different character classes may have varying animations. For example, in a sports game, the crowd action component 234 may associate a crowd of agents with an audience class while associating another crowd of agents with a cheerleading class. The agents in the audience class may perform actions such as standing up, sitting down, or giving high fives, while the agents in cheerleading crowd may perform actions specific to cheerleading class such as dancing.

In some implementations, head tracking can be enabled for a crowd of agents. Accordingly the head or the body of the agents may move based on a focal point. For example, in a soccer game, the focal point may be the soccer ball. The heads of the agents may move as the location of the soccer ball changes. The crowd action component 234 can restrict the degree of movements. For example, the crowd action component 234 can restrict the head movement to be within a certain range so that the virtual human will not turn his head 360 degrees.

The crowd action component 234 can provide interactions among agents within the same crowd or different crowd. For example, a crowd of agents may stand in the golf course. When the player has a nice drive, the crowd action component 234 may provide an animation for a high-five among the agents in the crowd. As another example, an agent in the back of the crowd may lift a child on the shoulders to see over the crowd in the front.

Additionally or alternatively, the crowd action component 234 can provide animations based on interactions with nonplayer characters and player characters. For example, as the player character passes through the crowd of agents, the agents may move to the side to clear a path for the player character. As another example, the crowd action component 234 may provide an animation where agents of the crowd make purchases at an equipment dealer.

The crowd action component 234 can provide animations based on events in the game. For example, in a golf game, when the ball is flying toward the crowd, the agents in the crowd may duck or run away from the ball. As another example, the crowd action component 234 can play a clapping animation when a sideline character appears in a sports game.

Besides one-off animations, the crowd action component 234 can associate a cut scene logic and/or a script logic with a crowd of agents so that the agents may perform a series of animations. For example, in a sports game, the crowd action component 234 can associate a series of animations, such as, for example, walking into the stadium, finding a seat, sitting down, and talking with neighbors, with a crowd of agents.

To avoid agents having synchronized animations, the crowd action component 234 can associate an offset to an agent. The crowd visualization system 122 can delay the start of the animation based on the offset, where there is no delay when the offset is zero. For example, the crowd action component 234 can associate a maximum offset to a crowd of agents. Within the crowd, the crowd action component 234 can randomly assign to an agent an offset in the range of 0 to the maximum offset. Because the agents in the crowd may have different offsets, the game application 122 can play animation for each agent at different times. As a result, when the crowd is clapping for a nice shot in a golf game, for example, the agents in the crowd can start clapping at different times. The offset may be used for one-off animations as well as for a series of animations where the agents may start the series at different times.

In some implementations, the crowd rendering system 150 may use texture-based animations. The crowd action component 234 can deposit various animations into an animation texture. At run time, the crowd visualization system 122 can communicate with the GPU and select proper animations for the crowds of agents. This texture-based technique may be particularly advantageous for providing a varied crowd at run time because it may not significantly slow down the performance of the game.

Example Processes for Customizing a Crowd

Figure 3:
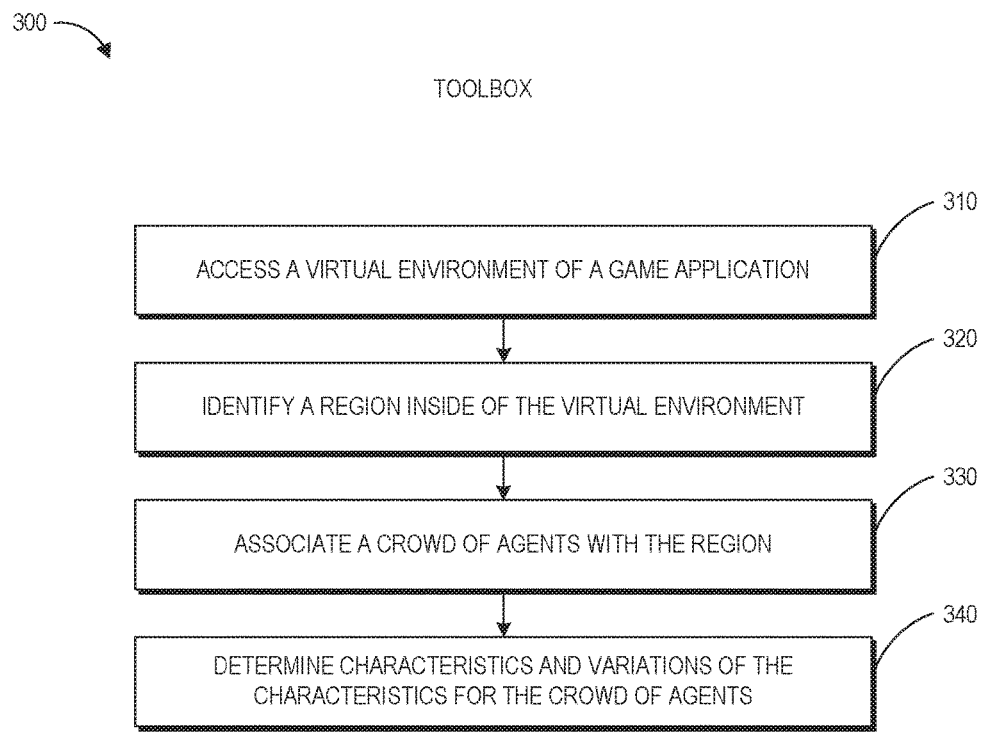
FIG. 3 illustrates an embodiment of a process for customizing a crowd.

FIG. 3 illustrates an example process for customizing a crowd. The instructions for customizing the crowd may be used by the player computing system 110 to render the crowd of agents during runtime. The process 300 can be implemented by any system that can configure various instructions for rendering a crowd of agents in a virtual environment of a game application. For example, the process 300, in whole or in part, can be implemented by a crowd rendering system 150, a crowd generation system 152, a crowd variation system 154, a crowd animation system 156, an interactive computing system 130, or other application module. Although any number of systems, in whole or in part, can implement the process 300, to simplify discussion, the process 300 will be described with respect to particular systems. Further, although embodiments of the process 300 may be performed with respect to variations of systems comprising various game application environments, to simplify discussion, the process 300 will be described with respect to the crowd rendering system 150.

At block 310, the crowd rendering system 150 can access a virtual environment in a game application. For example, in a golf tournament game, the virtual environment may be a golf course.

At block 320, crowd rendering system can create various regions within the virtual environment. The regions may include 2D or 3D shapes. For example, the region may include a stadium in a sports game. The system can create the regions based on input from a user or other system.

At block 330, the crowd rendering system 150 can associate a crowd of agents with the region. For example, in a sports game, the crowd of agents may include virtual humans. The crowd may be associated with one or more regions within the virtual environment. For example, in a virtual stadium, the crowd may be associated with the seating areas in the virtual stadium. The crowd rendering system 150 can put all hardcore fans in a region that is close to the field; put all agents with cameras in a region with a press box; designate a region in the stadium for a band; and so on.

In some implementations, the crowd may be associated with an object. For example, the crowd rendering system 150 can attach a point cloud for a crowd of agents to a stadium in a sports game. The crowd rendering system 150 can associate one or more distribution techniques, such as random distribution, Poisson random distribution, rule-based distribution, with the region. The crowd rendering system 150 can specify a population of the region, which can be less than or equal to the maximum capacity of the region. These crowd distribution techniques and the specified population of the region may be used by player computing system 110 to distribute the agents within the region of the virtual environment during runtime.

Additionally, the region may be associated with a weight, which may determine how fast the region is filled dynamically during the game application. For example, region A in a golf course may be associated with a weight of one while region B in the same golf course may be associated with a weight of two. As a result, when the audience walks into the golf course, the space in region B is going to be filled two times faster than that in the region A.

At block 340, the crowd rendering system 150 can determine various characteristics and variations of the characteristics for the crowd of agents. The characteristics may include appearance, location, animation, movement and so on. For example, the crowd rendering system 150 can assign standing and sitting animations to the crowd. As another example, in a sports game, the crowd rendering system 150 can assign different outfit templates for male regular fans, female regular fans, male hardcore fans, and female hardcore fans. For example, the male regular fans may wear everyday jeans and t-shirts, while the male hardcore fans may wear a hat and a shirt associated with the team which they are supporting. In some implementations, the outfit template may be assigned to a region. For example, in a stadium of a sports game, the crowd rendering system 150 can associate an outfit with a band located in the designated area in the stadium.

The crowd rendering system 150 can customize these characteristics. For example, the crowd rendering system 150 can add color variation and texture variations to appearances (such as shirts and pants) of the agents. As another example, the crowd rendering system 150 can associate various animation offsets to agents in the crowd so that, during runtime, the player computing system 110 will not start the same animation at the same time for every agent.

The characteristics and their variations may be associated with weights. The weight may be based on the likelihood of a certain characteristic and/or a variation being chosen. For example, the crowd rendering system 150 can attach to a weight to a style of shirt, where a higher weight is associated with a higher probability of being chosen. The crowd rendering system 150 can also attach a weight to an animation. For example, if the weight of the animation for sitting is two and the weight of the animation for standing is four, then the standing pose is more likely to be chosen by the player computing system 110 when the agent is generated and rendered during runtime.

Figure 4:
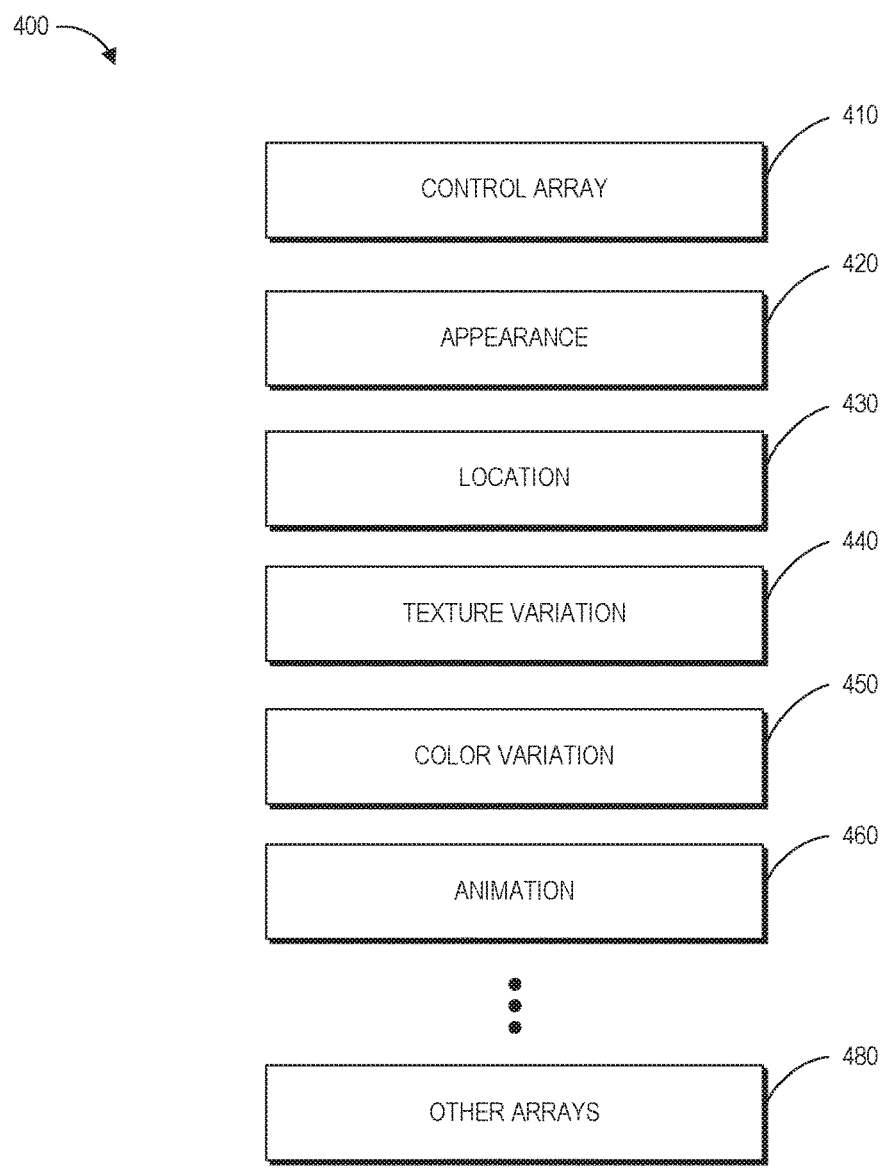
FIG. 4 illustrates an embodiment of a data structure for generating a crowd with customized variations.

Examples for Generating a Crowd with Customized Variations in a Game Application FIG. 4 illustrates an example data structure for generating a crowd of agents during runtime of a game application. The data structure 400 can include various asset arrays associated with characteristics of the agents, such as appearance characteristics, movement characteristics, animation characteristics, and so on. The arrays shown in FIG. 4 are for illustrative purposes and are not intended to be limiting. More or fewer arrays may be included for the game application 120. One or more arrays illustrated in FIG. 4 may be a part of another array. For example, in some implementations, information stored in the texture variation array 440 or the color array 450 may be stored in the appearance array 420. Additionally, although the data structure 400 is described using arrays, the data structure 400 is not limited to arrays. Other types of data structures, such as trees, may also be used in addition or in the alternative.

One or more of these asset arrays may be populated by the player computing system 110 (such as the crowd visualization system 122) during runtime, such as when the game application 120 is loading, based on the instructions defined by the crowd rendering system 150. As an example, during runtime, the player computing system 110 can populate the location array 430 by specifying a location of each agent based on the density of the crowd previously defined using the crowd rendering system 150. The player computing system 110 can also populate the appearance array 420 by selecting outfits based on probabilities associated with the outfits or other rules. Additionally, the player computing system 110 can randomly populate texture variation array 440 and color variation array 450 during runtime. The player computing system 110 can use the instructions previously defined by the crowd rendering system 150 to procedurally select from a pool of available textures and colors and populate the texture variation array 440 and the color variation array 450 based on the selection.

The asset arrays may be also be updated during run time, for example, in response to an event in the game. For example, an explosion event may occur in a game application. The explosion may destroy one or more agents. Based on this event, the player computing system 110 can update the control array 410 to remove the destroyed agents. As another example, a car accident may occur during a game which can cause damage to an agent. The mesh array (not shown in FIG. 4) may be updated to reflect this damage.

In the illustrated embodiment, the asset arrays in the data structure 400 include: an appearance array 420 which may include what meshes each agent is composed of, what type of clothes each agent is wearing; a location array 430 which may have information on the position, orientation, and scale of each agent; a texture variation array 440 for identifying which texture variation should be applied to an agent's appearance; a color variation array 450 for identifying one or more colors associated with an agent's outfit; an animation array 460 which can store animation information such as which animation is the agent is playing, what offset the agent has, what the status of the head tracking is, and so on. In addition to or in alternative to these arrays, the data structure 400 may include other arrays 480. For example, there may be an offset array including animation offset for each agent in the crowd.

In FIG. 4, the data structure 400 can include a control array 410 for storing the index of each agent in a crowd. The index stored in the control array 410 may be used to access corresponding characteristics in the various asset arrays. For example, when the crowd visualization system 122 renders an agent, the player computing system 110 can obtain the index of the agent from the control array. Assuming the index is 1340, the player computing system 110 can obtain information at index 1340 for all the arrays, such as the appearance array 420, the location array 430, the texture variation array 440, the color variation array 450, the animation array 40, and other arrays 480.

Although the examples described herein use the control array 410 to access information associated with an agent, in some implementations, the crowd visualization system 122 can access asset arrays directly without obtaining an index from the control array 410. While some example arrays have been disclosed, it is recognized that additional or other types of arrays could be used.

Example Processes for Providing a Crowd with Customized Variations

Figure 5:
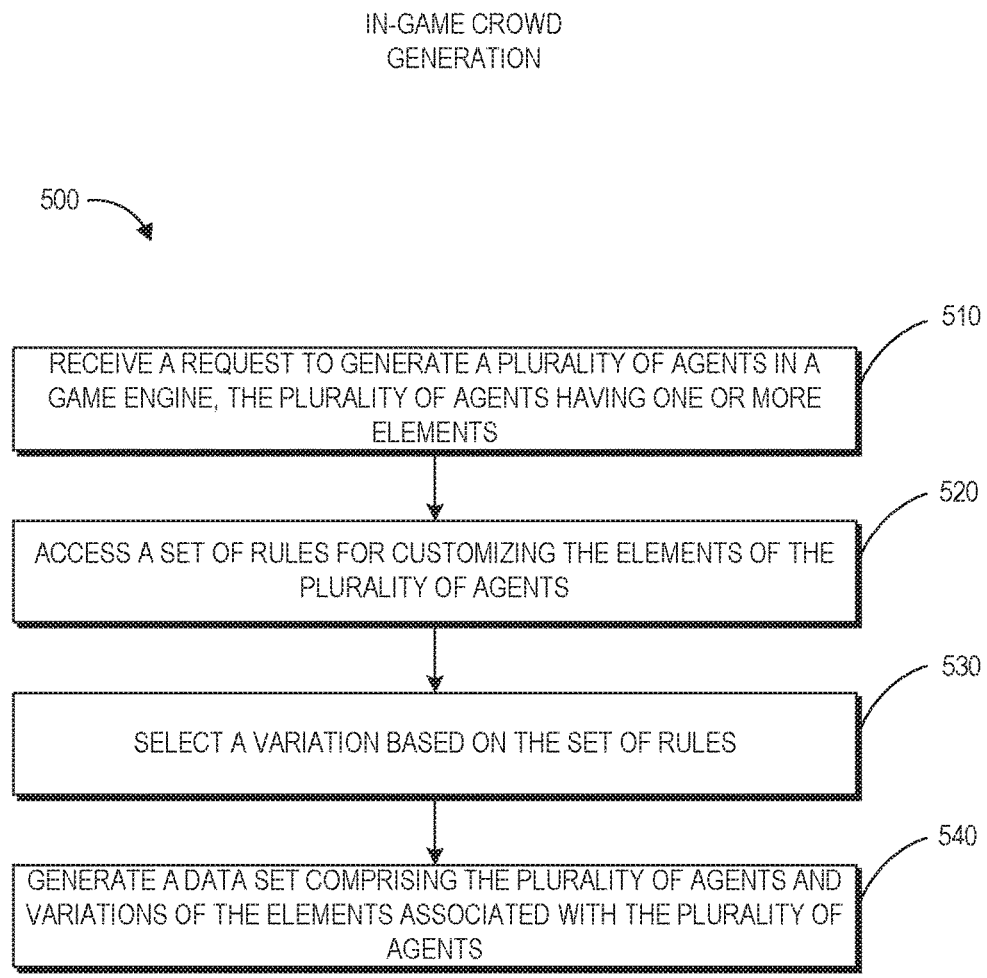
FIG. 5 illustrates an embodiment of a process for rendering a crowd with customized variations in a game.

FIG. 5 illustrates an example process for rendering a crowd with customized variations during runtime of a game application. The process 500 can be implemented by any system that can configure various instructions for rendering a crowd of agents in a virtual environment of a game application. For example, the process 500, in whole or in part, can be implemented by a crowd visualization system 122, a game engine 118, a player computing system 110, or other application module. Although any number of systems, in whole or in part, can implement the process 500, to simplify discussion, the process 500 will be described with respect to particular systems. Further, although embodiments of the process 500 may be performed with respect to variations of systems comprising various game application environments, to simplify discussion, the process 500 will be described with respect to the crowd visualization system 122.

At block 510, the crowd visualization system 122 can receive a request to generate a plurality of agents in a game engine. The crowd visualization system 122 can receive a request when the game application is loading. The crowd visualization system 122 can also receive the request in response to an event in the game, such as, for example, when a user travels to a different part of the virtual environment in the game application 120.

The plurality of agents may have different elements. For example, trees in a game may have tree trunks and leaves while a virtual human may have a head, arms, legs, and torso. Each part may include multiple variations, such as color and texture variations. For example, the tree trunks may have different colors and textures, and the tree leaves may have different shapes.

At block 520, crowd visualization system 122 can access a set of rules for customizing the elements of the agents. The set of rules may be provided by the crowd rendering system 150. For example, the set of rules may include information on how often a variation is chosen, as well as what variation should be chosen.

At block 530, crowd visualization system 122 can select a variation based at least in part on the set of rules. The variation may be a type of clothing such as a t-shirt, dress, or pants for elements of the agent. In some implementations, the crowd rendering system 150 may have already assigned an outfit template (such as suits) to a crowd of agents. The crowd visualization system 122 can select a color or texture variation at run time for agents in the crowd.

At block 540, the crowd visualization system 122 can generate a data set including the variations selected in accordance with the set of rules. The data set may include a control array 410 and various asset arrays as shown in FIG. 4. For example, the crowd rendering system 150 can populate these arrays based on the variations associated with the agents.

Although the process 500 is described with reference to varying appearance among a crowd of agents, the process 500 can also be used to provide variations of animations among the agents. For example, besides customizing elements of the agents, a similar process can also be used to customize offset of animations for the agents.

Examples of Event-Based Animations

Figure 6:
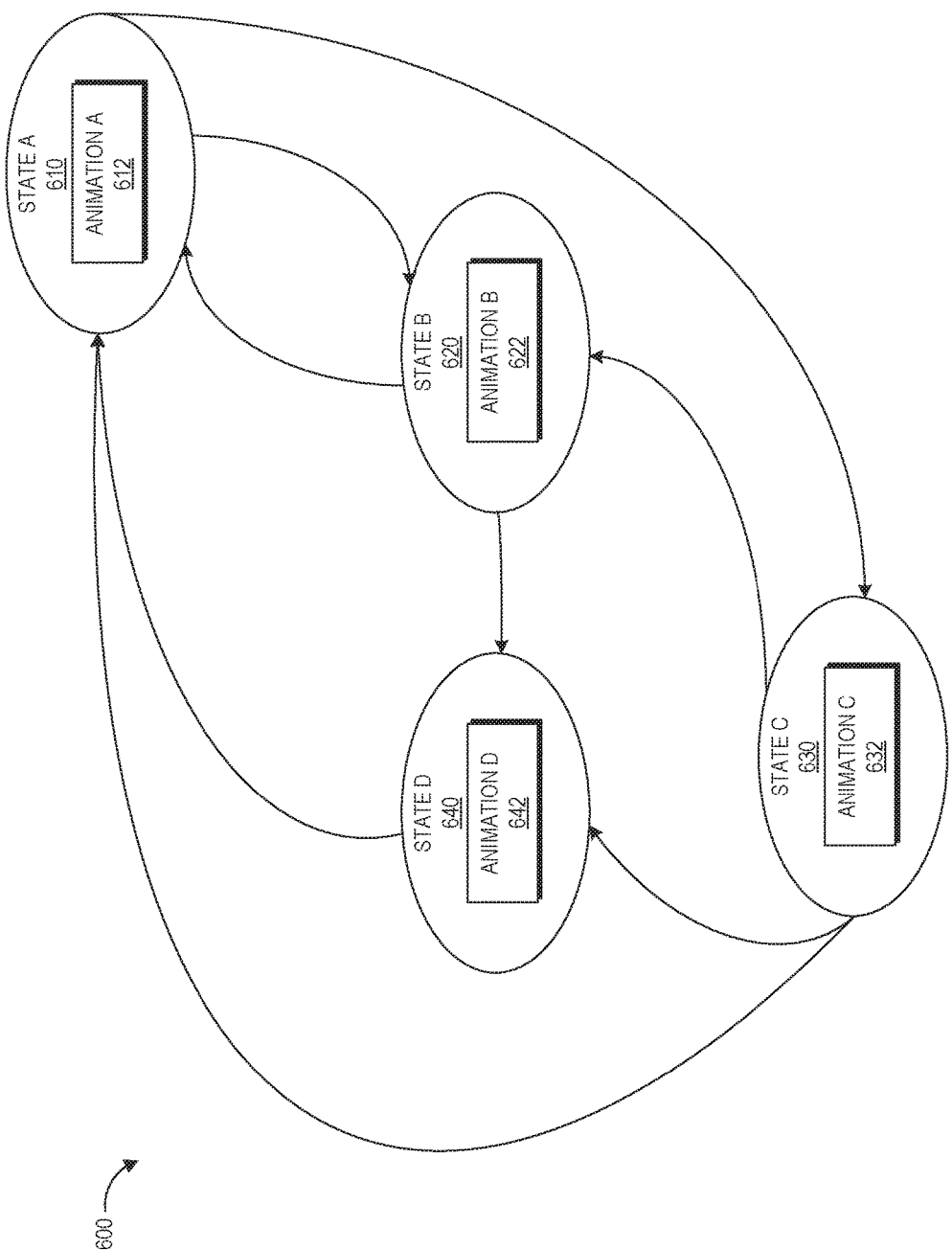
FIG. 6 illustrates an embodiment for changing animations based on events in a game.

FIG. 6 illustrates an embodiment for changing animations based on events in a game application. The state diagram 600 in FIG. 6 may be performed under the computing environment 100 in FIG. 1. For example, the state diagram 600 may be configured by the crowd rendering system 150 and be executed by the CPU 112 and/or the GPU 114. Executing state flow logic by the GPU 114 is particularly advantageous because GPUs can provide fast and efficient parallel processing, and thereby can reduce execution time of the state flow logic.

As described with reference to FIGS. 1 and 2, the crowd rendering system can associate one or more animations to a crowd of agents. The crowd may change from one animation to the other based on the events of the game and/or the state of the agents. For example, in the state diagram 600, state A 610 may be an idle state. During this state, the game application 120 may play the animation A 612 which is associated with the state A 610. The animation A 612 may include, for example, standing or swinging side by side in a sports game.

While the game application 120 is in state A 610, an event in the game application can trigger the game application 120 to move to the state C 630 and play the animation C 632 associated with state C 630. Then the state may transition back to state A 610 from state C 630 upon another event. For example, when the game player had a very nice hit in a golf game, the game application can move from an idle state to a clapping state where the game application 120 will change the animation of the agents from standing still to clapping. The agents can clap for two seconds and the game application 120 can go back to the idle state where the agents no longer clap.

As another example, while the agents in the crowd may initially stand still in the state A 610. The player may hit a ball into the crowd, which may trigger a state change from state A 610 to state B 620 for agents that are on the trajectory of the ball. At state B 620, the game application can play animation B 622 where the agents can duck or run away from the ball. After the ball falls to the ground, the current state of these agents may switch from state B 620 back to state A 610. In some situations, however, the ball may actually strike one of the agents despite the agent trying to run away from the ball. For this agent, the state may change from state B 620 to state D 640. At state D, the game application 120 can play the animation D 642 which may show the agent reacting to the pain such as grabbing his arm. After a period of time, the state for the agent may change from state D 640 to state A 610 after a defined period of time.

Although the state flow diagram 600 is described with reference to one animation per state, the examples are not limited to only one animation per state. A state may include multiple animations played in series for one or more agents. For example, when an agent is hit by a ball, the game application can play animations for grabbing the arm, jumping around, and exiting the field.

In addition or in alternative to triggering an animation, an event of a game application can change the appearance of the agent. For example, when a virtual human leaves a stadium, the clothes of the agent may be changed from a t-shirt to a coat. The event can also trigger the spawning of agents. For example, in response to winning a match, the crowd visualization system 122 may spawn a cheerleading team. The event can also cause one or more agents or a portion of the agent to be hidden from the game player's view. For example, in response to a nice shot in a sports game, some of the agents may take their hats off. On the other hand, the agents can put their hats back on in response to another event in the game application 120.

Example Processes for Event-Based Animations

Figure 7:
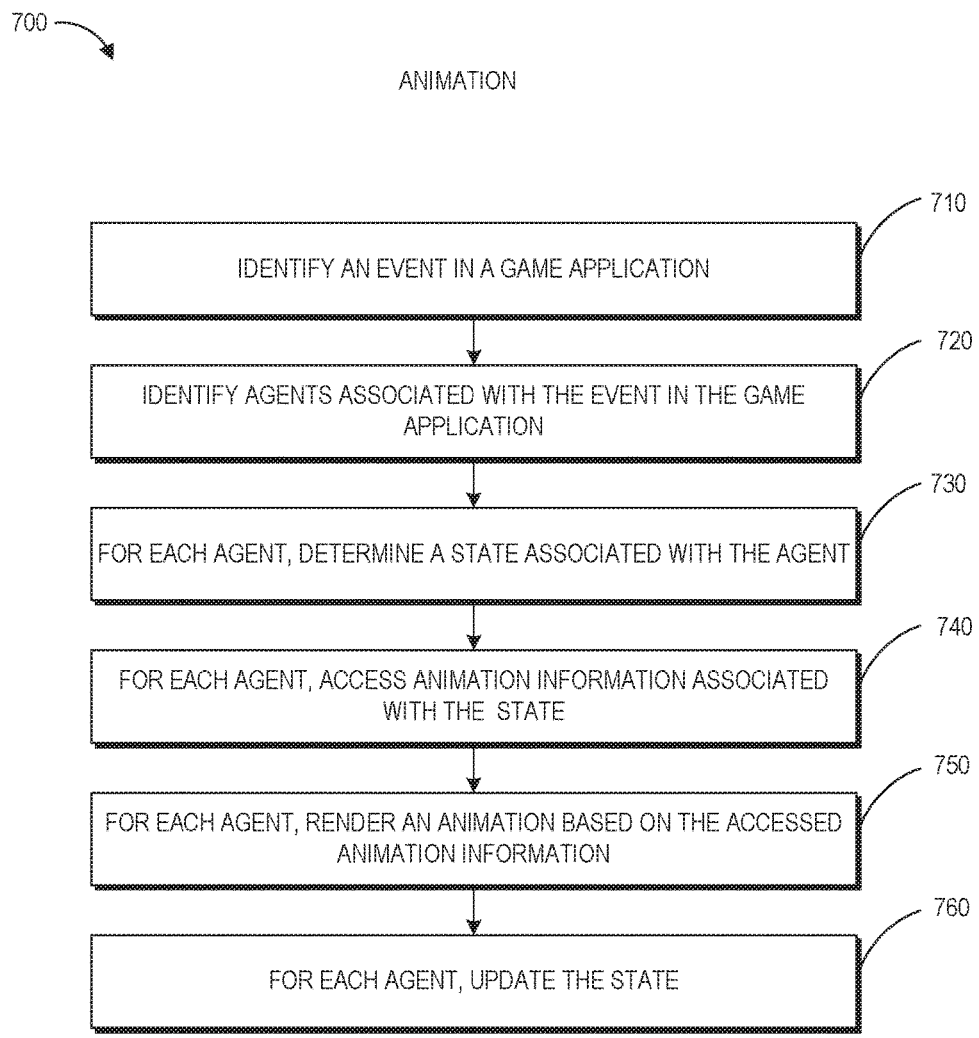
FIG. 7 illustrates an embodiment of an example process for rendering and customizing animations based on events in a game.

FIG. 7 illustrates an example process for rendering and customizing animations based on events in a game. The process 700 can be implemented by any system that can configure various instructions for rendering a crowd of agents in a virtual environment of a game application. For example, the process 700, in whole or in part, can be implemented by a crowd visualization system 122, a game engine 118, a player computing system 110, or other application module. Although any number of systems, in whole or in part, can implement the process 700, to simplify discussion, the process 700 will be described with respect to particular systems. Further, although embodiments of the process 700 may be performed with respect to variations of systems comprising various game application environments, to simplify discussion, the process 700 will be described with respect to the crowd visualization system 122.

At block 710, an event may be triggered in a game application. The crowd visualization system 122 can identify the agents associated with the event in the game application at block 720. For example, an event in a golf tournament game may be that a game player hits a ball toward the crowd. The crowd visualization system 122 in the computing environment 100 may identify one or more agents that may be in the direction of the ball.

At block 730, the system(s) can determine the states of the respective agents. The current state of an agent may be determined using information in the previous state and/or events in the game. As described with reference to FIG. 6, the state of the agent may be state A 610 (where the agent stands still). In response to the player character striking a ball, the state of an agent may change from state A 610 (where the agent stands still) to state B 620 (where the agent runs away from the ball) when the ball is flying close to the agent.

The crowd visualization system 122 can keep a history of the agents' poses and/or animations over time. The history may be logged using a buffer, such as a ring buffer. For example, the crowd visualization system 122 may include a texture array acting as the ring buffer for animations. The animation history may have a maximum length corresponding to the size of the ring buffer. As the game application 120 moves forward in time, the crowd visualization system 122 can put new frames of animations into the texture array, such as in the beginning or the end of the texture array. In some embodiments, the ring buffer can be used for playing animations in accordance with the state flow of the agent (such as the state flow shown in the state flow diagram 600 in FIG. 6). For example, in a sports game, the crowd visualization system 122 can use the index associated with an agent to access a ring buffer for the animation history. The history may indicate that the next available animation for the agent is standing. As a result, the system(s) may determine that the current state of animation is standing.

At block 740, the crowd visualization system 122 can access information associated with the current state of the agent. For example, the animation information may include an offset of the animation, next possible states based on events in the game, previous states, animations and appearance of the agent in the current state, and so on. The animation information associated with each agent may be different, for example, based on their previous state. As described with reference to FIGS. 1 and 2, offsets may also vary for different agents. For example, the game developer can set a maximum offset and the system(s) can assign an offset to an agent within the range of the maximum offset. Assigning the offset may be performed using a uniform distribution, although the game developers can also customize the offsets using other techniques. For example, one of the agents may have an offset of zero so that the agent may immediately start clapping when the clapping animation is triggered. Another agent may have a half second offset, so the agent may start clapping half a second later. In some embodiments, the offset associated with the agent may change from one state to another. For example, the crowd visualization system 122 can randomly assign an offset to an agent in each state. The system(s) can also change the maximum offset for different states, therefore causing the offset to vary in different states.

As an example, the crowd visualization system 122 can obtain animation information from an animation array (such as the animation array 470 shown in FIG. 4) using the index of the agent. The animation information obtained may be playing animation number 37 with a 0.5 second offset. Based on this information, the crowd visualization system 122 can obtain graphics information. For example, the crowd visualization system 122 can retrieve proper poses associated with a selected animation. Furthermore, because there is a 0.5 second offset, the crowd visualization system 122 may instruct game application 120 to play the selected animation for that agent with a 0.5 second delay.

At block 750, the crowd visualization system 122 can render an animation based on the accessed animation information. For example, in a golf game, when a ball is flying toward an agent, the system(s) may play a ducking animation showing that the agent tries to avoid being hit by the ball. As another example, the crowd visualization system 122 can determine whether the agent was in a sitting pose in the previous pose. If the agent was in the sitting pose, when the ball is flying toward the agent, the crowd visualization system 122 may render a ducking animation. On the other hand, if the agent was in a standing pose, then the crowd visualization system 122 may render a running animation when the ball is flying toward the agent. System may pre-render if known that a state is coming up soon or highly likely to come up.

Example Processes for Batch Rendering

Figure 8:
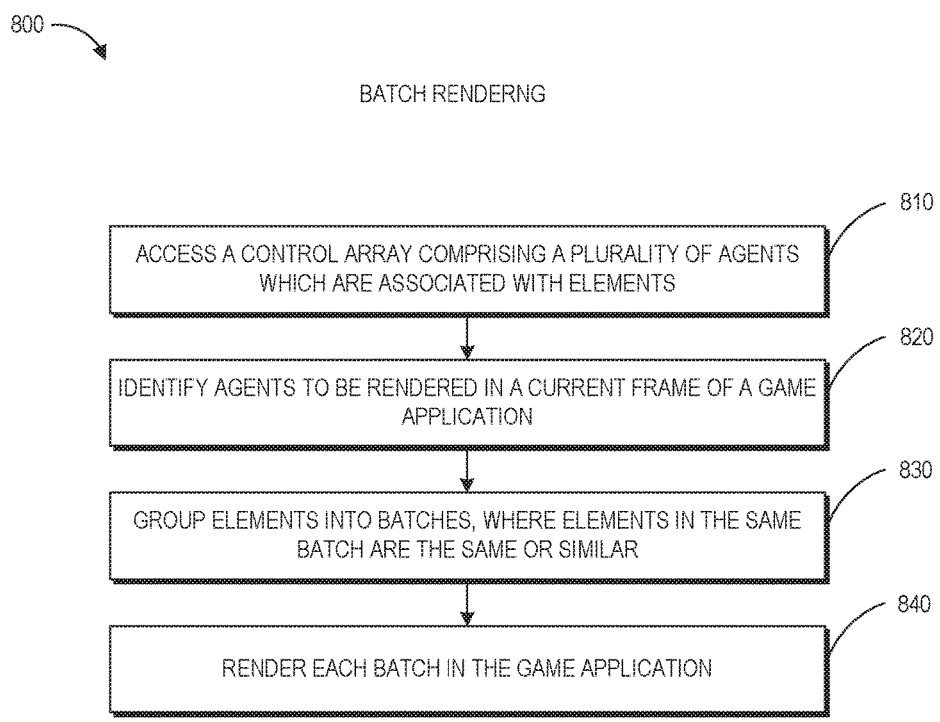
FIG. 8 illustrates an embodiment of an example process for batch rending a crowd during runtime of a game application.

FIG. 8 illustrates an example process for batch rending a crowd during runtime of a game application. The process 800 can be implemented by any system that can configure various instructions for rendering a crowd of agents in a virtual environment of a game application. For example, the process 800, in whole or in part, can be implemented by a crowd visualization system 122, a game engine 118, a player computing system 110, or another application module. Although any number of systems, in whole or in part, can implement the process 800, to simplify discussion, the process 800 will be described with respect to particular systems. Further, although embodiments of the process 700 may be performed with respect to variations of systems comprising various game application environments, to simplify discussion, the process 800 will be described with respect to the crowd visualization system 122.

At block 810, the crowd visualization system 122 can access a control array. The control array may be the control array 410 in FIG. 4. The control array may include indices of a crowd of agents. The agents may have one or more elements. In some implementations, the control array also includes elements associated with each agent.

At block 820, the crowd visualization system 122 can identify the agents to be rendered in a current frame of a game application 820. As described with reference to FIG. 2, in some situations, the agents may be configured off-screen and are only rendered when the PC changes the field of view. As a result, the crowd visualization system 122 may render only a subset of agents among the agents in the control array.

At block 830, the crowd visualization system 122 can group elements into different batches based on the similarities of the elements. For example, crowd visualization system 122 can group the agents based on their meshes, where agents with the same or similar meshes are grouped together. As another example, men and women may be grouped in the same batch if they use the same or similar underlying meshes. However, tree trunks and heads of virtual humans may be grouped into different batches because they have different underlying meshes.

As a further example, in a sports game, the stadium may include an audience and a band. The band may include instruments that the audience does not have. The crowd visualization system 122 can group elements of the band members and audience members in the same batch, while grouping the instruments in other batches. For example, the crowd visualization system 122 can render heads that have the same or similar meshes together while batching and rendering the torsos, instruments, and other meshes separately.

Grouping agents (or elements of the agents) based on similar meshes are particularly advantageous to some embodiments because it can support rendering of agents (or elements of the agents) in the same batch during runtime of the game application, despite that the agents may have varied appearances and animations. This technique may save processing time and computer resources on rendering the 3D characters individually during runtime.

The crowd visualization system 122 can retrieve characteristics associated with the respective agents, such as appearance, animation, location, and so on. For example, the crowd visualization system 122 can use the index of the agent to obtain the characteristics of the agent from the asset arrays described with reference to FIG. 4. The graphics of various characteristics as well as the data structures of the characteristics may be stored in the data store 116 of the player computing system 110. These characteristics may be used by the crowd visualization system 122 to render the agents during runtime.

At block 840, the crowd visualization system 122 can render the elements based on the determined batches during runtime of a game application. For example, the heads may be rendered together; the tree trunks may be rendered together; the cars may be rendered together; and so on. The crowd visualization system 122 can send the characteristics of each agent to the GPU 114 where the GPU may render agents in a batch or render different batches in parallel.

Example User Interfaces

Figure 9:
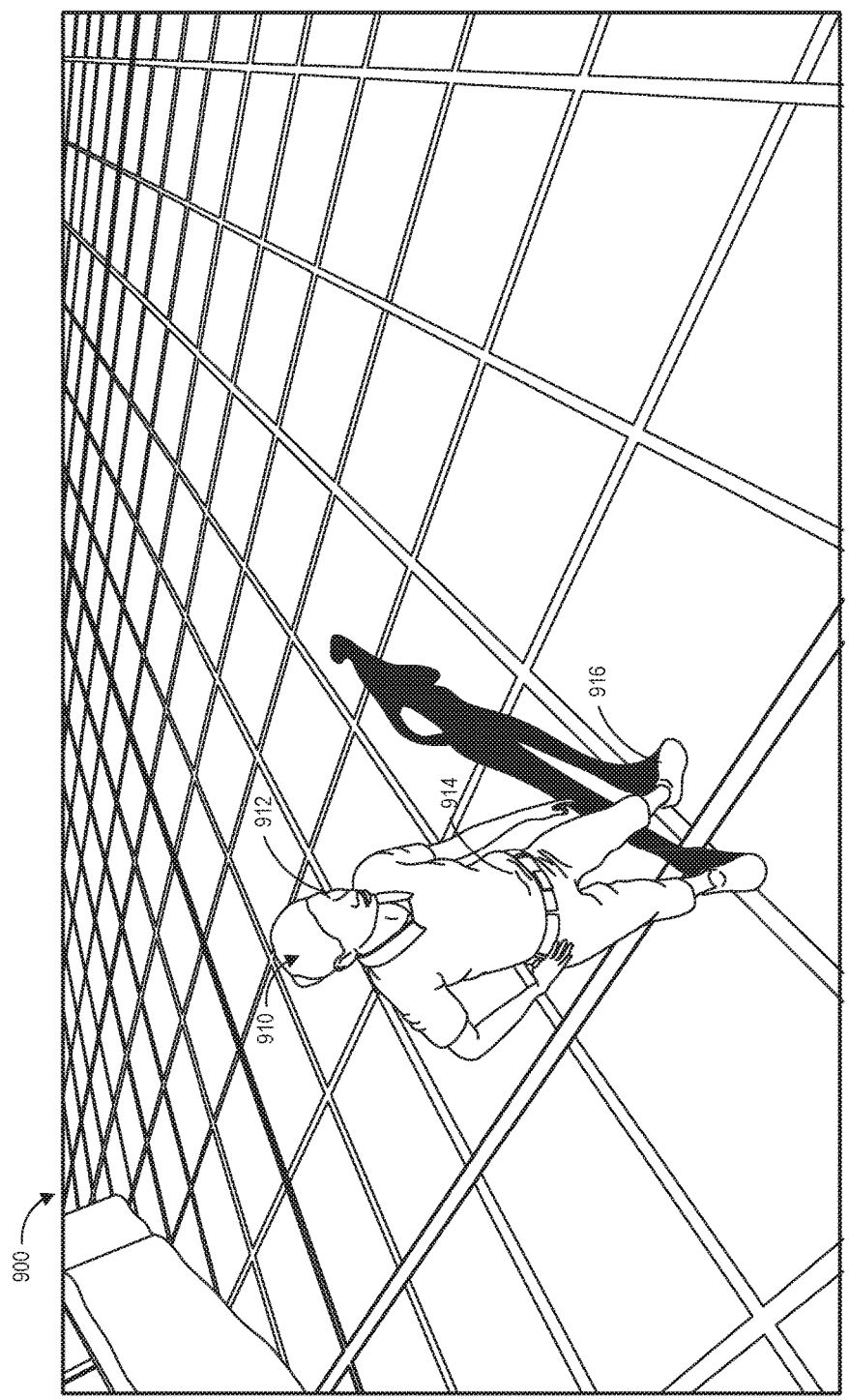
FIG. 9 illustrates an embodiment of an example of a user interface showing an agent in a game environment.

FIG. 9 illustrates an example of a user interface showing an agent in a game environment. In FIG. 9, the user interface 900 includes an agent 910 in a game environment. The agent may be made of different elements, such as a head 912, a torso 914, and feet 916. As described herein, different elements of the agent may be associated with different meshes. For example, in FIG. 9, the head 912, the torso 914, and the feet 916 may each associate with a mesh. The crowd rendering system 150 (shown in FIGS. 1 and 2) can assemble these meshes to create the individual 910.

On top of the meshes, the crowd rendering system 150 can add a skin layer. Each mesh may have a skin layer. The skin may include outfit of the agent, hair, skin, and the like. For example, as shown in FIG. 9, the skin of the agent 910 may include a t-shirt, a pair of pants, a pair of shoes, a style of hair, and a face. Each element can have a different mesh.

The crowd rendering system 150 can vary the appearance of the skin when there are a crowd of agents. For example, the agents in the crowd may have different styles of t-shirts, different colors of pants, different types of shoes, different hair styles, different skin tones for the face, and so on.

FIG. 10 illustrates an example of a user interface showing a plurality of agents in a region of a game environment. The user interface 1000 illustrates two regions 1012 and 1014 in a virtual environment. The region 1012 is associated with the crowd 1022 while the region 1014 is associated with the crowd 1024.

As described with reference to FIGS. 1 and 2, the crowd rendering system 150 can allow game developers to specify different regions in the virtual environment. The game developers can also add obstacles to the virtual environment so that the agents will not be placed inside of the obstacles. In this example, the region 1012 includes a golfing area 1032 while the region 1014 includes another golfing area 1034. The areas 1032 and 1034 may be intended to only be used by game players. Accordingly, the game developers can specify these two areas as obstacles so that the agents will not be spawned into these two areas. Similarly, the tree 1016 can be specified as an obstacle as well so that the agents will not generated inside of the tree 1016.

The regions may be specified with respective capacities. The capacity may be associated with densities of the region. For example, the region 1012 may have a high capacity. On the other hand, the region 1014 may have a low capacity.

In addition or in alternative to determining the capacity and populations of the regions, the game developers can attach weights to different regions of the virtual environment. For example, a high weight can cause the region to be more densely populated. With reference to FIG. 10, the weight assembled with region 1012 is greater than the weight associated with region 1014. As a result, the region 1012 can be more densely populated than the region 1014. As shown in FIG. 10, the crowd 1022 in the region 1012 can appear to be more crowded than the crowd 1024 in the region 1014.

The crowd rendering system 150 can distribute agents in each region using a various distribution algorithms, such as Poisson random distribution. The crowd rendering system 150 may also account for weights and capacity when distributing the agents. For example, the crowd rendering system 150 can have a total number of agents to spawn. In some embodiments, the crowd rendering system 150 can fill up a region with a heavier weight faster. If the region with the heavier weight is filled up, the crowd rendering system 150 can stop adding agents to this region and instead continue to fill the region with a lighter weight.

Figure 11:
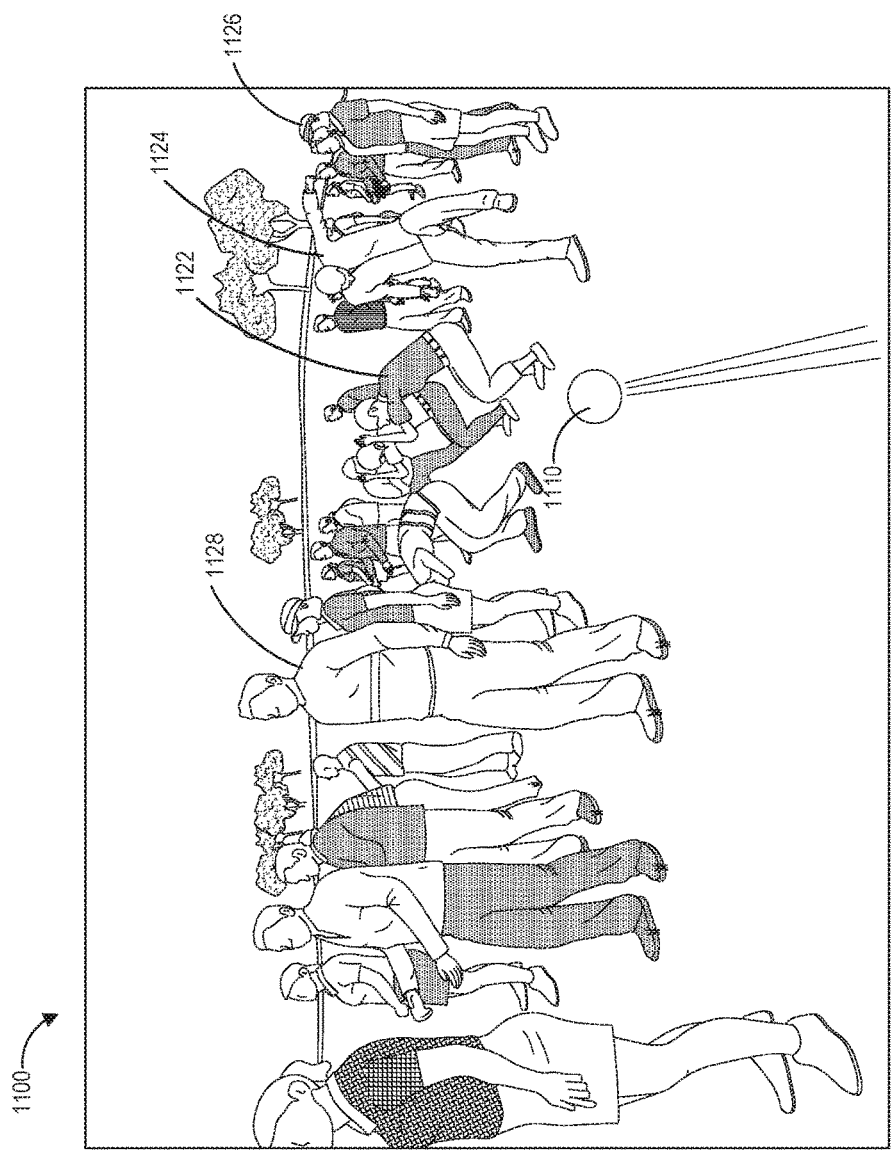
FIG. 11 illustrates an embodiment of an example of a user interface showing customized animation in a game application.

FIG. 11 illustrates an example of a user interface showing customized animation in a game application. FIG. 11 shows a crowd of agents with varied appearances and animations. For example, the agent 1126 is wearing shorts and a short-sleeve shirt while the agent 1128 is wearing a long-sleeve shirt and a pair of pants. As described herein, the crowd rendering system 150 can customize the appearances of the agents by assigning an outfit to the agent among a pool of outfits. The outfit may be randomly assigned. The crowd rendering system 150 can also vary the texture and color of the outfit by selecting from a pool of available textures and colors. The outfits, textures, and colors may be assigned weights, where the weight can be associated with the likelihood of being selected. For example, an outfit with a heavier weight may be selected often and therefore may have a more common appearance in the crowd.

The animations may show an agent's reaction to an event in a game application. In FIG. 11, a golf ball 1110 is flying toward a crowd of agents. The crowd of agents includes the agents 1122, 1124, 1126, and 1128.

The crowd visualization system 122 may play a ducking animation for the agent 1122 and the agent 1124 in the crowd to avoid being hit by the ball 1110. The crowd visualization system 122, however, may not show the ducking animation for the agent 1128 because the agent 1128 is not in the direction of the ball 1110, and probably will not be hit by the ball. As described with reference to FIG. 6, the animations may be associated with state flows in the game. When the ball 1110 hits the ground, the crowd visualization system 122 may change the state associated with the agents 1122 and 1124 from reacting to the ball to idle, and play the animations associated with the updated state.

The animation may also include interactions among the agents. For example, the agent 1126 may turn her body from facing the field to facing the agents 1122 and 1124 so that she can observe the agent 1122 or the agent 1124 being hit by the ball 1110.

Overview of Computing Device

Figure 12:
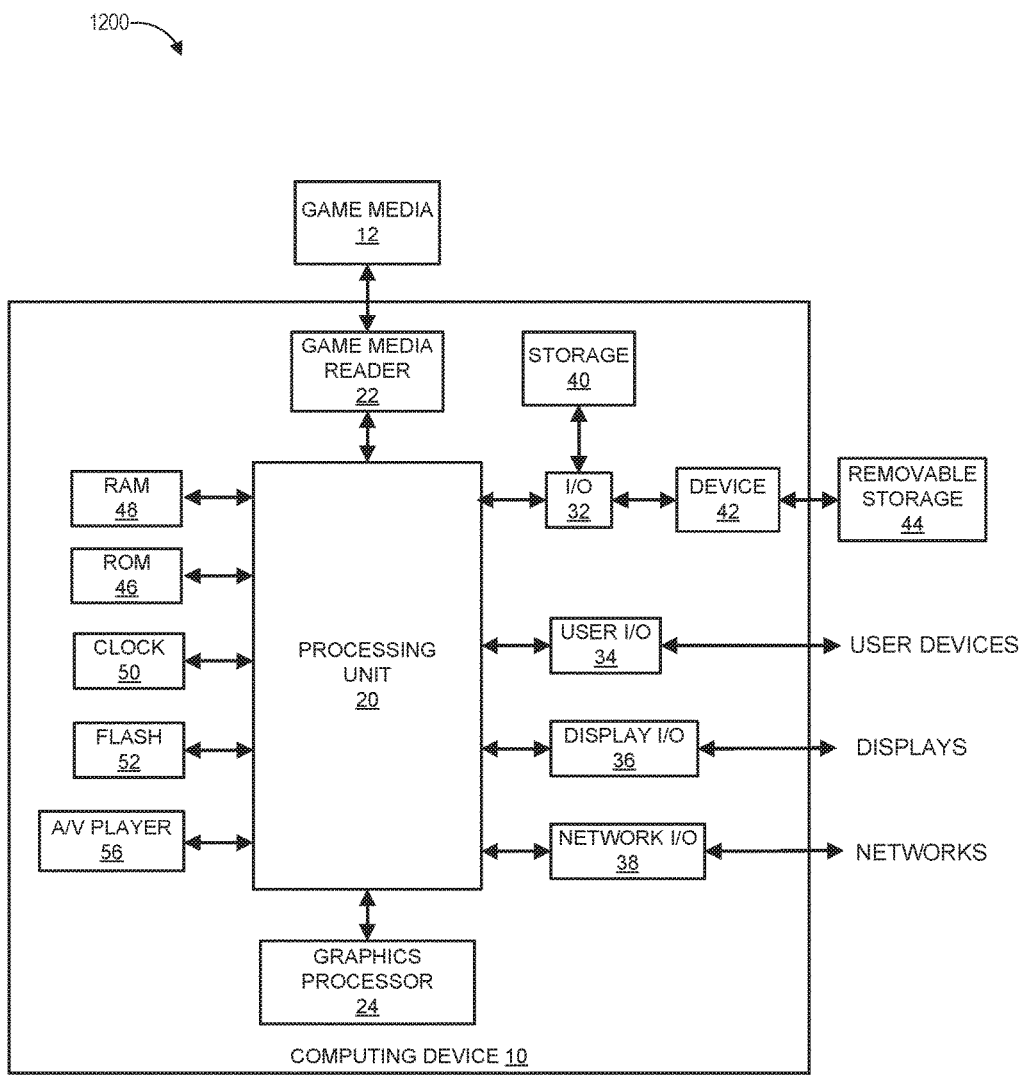
FIG. 12 illustrates an embodiment of a computing device.

FIG. 12 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system for generating a plurality of three-dimensional (3D) agents in a game application, the system comprising:
    a data store configured to store appearance data associated with a plurality of 3D virtual entities, wherein each 3D virtual entity comprises a plurality of elements, wherein each element comprises a mesh defining a shape of the element, wherein the data store is configured to store a plurality of arrays, the plurality of arrays comprising:
        a control array comprising indices of individual 3D virtual entities of the plurality of 3D virtual entities;
        a mesh array identifying meshes of individual 3D virtual entities of the plurality of 3D virtual entities;
        an animation array identifying animations of individual 3D virtual entities of the plurality of 3D virtual entities;
        an appearance array identifying outfits of individual 3D virtual entities of the plurality of 3D virtual entities;
        a texture variation array identifying textures associated with the outfits of the respective 3D virtual entities of the plurality of 3D virtual entities;
        a color variation array identifying colors associated with the outfits of individual 3D virtual entities of the plurality of 3D virtual entities; and
        an offset array identifying offsets in animation of individual virtual entities of the plurality of 3D virtual entities; and one or more processors configured with computer executable instructions that cause the one or more processors to execute a game application, the game application configured to:
- receive a request to render a subset of the plurality of 3D virtual entities within a virtual environment during runtime of the game application;
- for each of the subset of the plurality of 3D virtual entities,
  - access a plurality of appearances associated with the 3D virtual entity;
  - select an appearance from the plurality of appearances for the 3D virtual entity based, at least in part on a set of rules associated with the plurality of appearances, wherein the rules comprise weighted values associated with variations of the plurality of appearances, wherein a higher weighted value increases a probability of being selected;
  - access a plurality of animations associated with the 3D virtual entity;
  - select an animation from the plurality of animations for the 3D virtual entity based, at least in part on a set of rules associated with the plurality of animations, wherein the rules comprise weighted values associated with individual animations of the plurality of animations, wherein a higher weighted value increases a probability of an animation being selected;
  - select an offset for the animation of the 3D virtual entity; and
- group elements of the subset of the plurality of 3D virtual entities into one or more batches based, at least in part, on the mesh of individual elements, wherein elements with similar meshes are grouped into the same batch;
- render elements of each batch as a group and independent of other batches of the one or more batches; and
- generate instructions to output the rendered elements within a frame of the game application during runtime.

2. The system of claim 1, wherein the game application is further configured to select the variation of the appearance by using an index of the 3D virtual entity to retrieve the variation of appearance from the color variation array and the texture variation array based on the set of rules for selecting the color variation and the texture variation.

3. The system of claim 1, wherein the game application is further configured to select an offset for the animation of the 3D virtual entity by randomly selecting the offset from a defined range.

4. The system of claim 1, wherein the game application is further configured to:
- identify an event within the virtual environment of the game application;
- identify a set of 3D virtual entities of the plurality of 3D virtual entities that are affected by the event; and
- for each 3D virtual entity of the set of 3D virtual entities:
  - determine a state associated with the 3D virtual entity based, at least in part, on the event in the game application; and
  - determine the animation based, at least in part, on the state associated with the 3D virtual entity.

5. The system of claim 1, wherein the game application is further configured to:
- for each 3D virtual entity of the plurality of 3D virtual entities:
  - access a buffer comprising a history of animation associated with the 3D virtual entity; and
  - determine the animation based, at least in part, on the history of animations associated with the 3D virtual entity.

6. The system of claim 1, wherein at least some of the plurality of 3D virtual entities are virtual humans.

7. The system of claim 1, wherein the game application is further configured to add or hide at least a portion of one or more 3D virtual entities in response to an event in the game application.

8. A method for generating a plurality of three-dimensional (3D) virtual entities in a game application, the method comprising:
- under the control of a computer system comprising computer hardware, the computer system configured with computer executable instructions to execute a game application, the game application configured to perform operations during runtime of the game application including,
  - accessing a data store storing appearance data associated with a plurality of 3D virtual entities, the data store storing a plurality of arrays, the plurality of arrays comprising:
    - a control array comprising indices of individual 3D virtual entities of the plurality of 3D virtual entities;
    - a mesh array identifying meshes of individual 3D virtual entities of the plurality of 3D virtual entities;
    - an animation array identifying animations of individual 3D virtual entities of the plurality of 3D virtual entities;
    - an appearance array identifying outfits of individual 3D virtual entities of the plurality of 3D virtual entities;
    - a texture variation array identifying textures associated with the outfits of the respective 3D virtual entities of the plurality of 3D virtual entities;
    - a color variation array identifying colors associated with the outfits of individual 3D virtual entities of the plurality of 3D virtual entities; and
  - an offset array identifying offsets in animation of individual virtual entities of the plurality of 3D virtual entities;
  - receiving a request to render a subset of the plurality of 3D virtual entities within a virtual environment during runtime of the game application;
  - for each of the subset of the plurality of 3D virtual entities,
    - accessing a plurality of appearances associated with the 3D virtual entity;
    - selecting an appearance from the plurality of appearances for the 3D virtual entity based, at least in part on a set of rules associated with the plurality of appearances, wherein the rules comprise weighted values associated with variations of the plurality of appearances, wherein a higher weighted value increases a probability of being selected;
    - accessing a plurality of animations associated with the 3D virtual entity; and
    - selecting an animation from the plurality of animations for the 3D virtual entity based, at least in part on a set of rules associated with the plurality of animations, wherein the rules comprise weighted values associated with individual animations of the plurality of animations, wherein a higher weighted value increases a probability of an animation being selected;
selecting an offset for the animation of the 3D virtual entity; and
grouping elements of the subset of the plurality of 3D virtual entities into one or more batches based, at least in part, on the mesh of individual elements, wherein elements with similar meshes are grouped into the same batch;
rendering elements of each batch as a group and independent of other batches of the one or more batches; and
generating instructions to output the rendered elements within a frame of the game application during runtime.

9. The method of claim 8, wherein selecting the appearance comprises:
determining an index associated with the 3D virtual entity; and
retrieving the appearance from an appearance array based at least in part on the index.

10. The method of claim 8, wherein accessing the plurality of appearances is based, at least in part, on a class associated with the 3D virtual entity.

11. The method of claim 8, further comprising:
identifying an event in the game application;
identifying a set of 3D virtual entities among the plurality of virtual entities that are affected by the event;
for each 3D virtual entity of the set of 3D virtual entities:
determining a state associated with the 3D virtual entity based, at least in part on the event in the game application; and
determining the animation based, at least in part, on the state associated with the 3D virtual entity.

12. The method of claim 8, further comprising:
for each 3D virtual entity of the plurality of 3D virtual entities:
accessing a buffer comprising a history of animations associated with the 3D virtual entity; and
determining the animation based, at least in part, on the history of animations associated with the 3D virtual entity.

13. A non-transitory computer-readable medium storing computer-executable instructions that, when executed by one or more computing devices, configure the one or more computing devices to execute a game application, the game application configured to perform operations during runtime of the game application comprising:
accessing a data store storing appearance data associated with a plurality of 3D virtual entities, the data store storing a plurality of arrays, the plurality of arrays comprising:
a control array comprising indices of individual 3D virtual entities of the plurality of 3D virtual entities;
a mesh array identifying meshes of individual 3D virtual entities of the plurality of 3D virtual entities;
an animation array identifying animations of individual 3D virtual entities of the plurality of 3D virtual entities;
an appearance array identifying outfits of individual 3D virtual entities of the plurality of 3D virtual entities;
a texture variation array identifying textures associated with the outfits of the respective 3D virtual entities of the plurality of 3D virtual entities;
a color variation array identifying colors associated with the outfits of individual 3D virtual entities of the plurality of 3D virtual entities; and
an offset array identifying offsets in animation of individual virtual entities of the plurality of 3D virtual entities;
receiving a request to render a subset of the plurality of 3D virtual entities within a virtual environment during runtime of the game application;
for each of the subset of the plurality of 3D virtual entities,
accessing a plurality of appearances associated with the 3D virtual entity;
selecting an appearance from the plurality of appearances for the 3D virtual entity based, at least in part on a set of rules associated with the plurality of appearances, wherein the rules comprise weighted values associated with variations of the plurality of appearances, wherein a higher weighted value increases a probability of being selected;
accessing a plurality of animations associated with the 3D virtual entity;
selecting an animation from the plurality of animations for the 3D virtual entity based, at least in part on a set of rules associated with the plurality of animations, wherein the rules comprise weighted values associated with individual animations of the plurality of animations, wherein a higher weighted value increases a probability of an animation being selected; and
select an offset for the animation of the 3D virtual entity; and
grouping elements of the subset of the plurality of 3D virtual entities into one or more batches based, at least in part, on the mesh of individual elements, wherein elements with similar meshes are grouped into the same batch;
rendering elements of each batch as a group and independent of other batches of the one or more batches; and
generating instructions to output the rendered elements within a frame of the game application during runtime.

14. The non-transitory computer-readable medium of claim 13, wherein determining the appearance comprises:
determining an index associated with the 3D virtual entity; and
retrieving the appearance from an appearance array based at least in part on the index.

* * * * *